US012778824B2

(12) United States Patent
Driscoll, Jr. et al.

(10) Patent No.: US 12,778,824 B2
(45) Date of Patent: Nov. 3, 2026

(54) MEDICAL BED FRAME WITH ADJUSTABLE WIDTH AND LENGTH

(71) Applicant: Sizewise Rentals L.L.C., Lenexa, KS (US)

(72) Inventors: David Delroy Driscoll, Jr., Milwaukee, WI (US); Kristen Thurman, Tempe, AZ (US); Troy Parson, Ellis, KS (US); Jeffery Spreier, Hays, KS (US); John C. Moore, Hays, KS (US); Duane Edgar Wente, III, Hays, KS (US); Kenneth Scott Bower, Santa Ana, CA (US); Matthew Ray Isley, Hays, KS (US)

(73) Assignee: Sizewise Rentals LLC, Eden Prairie, MN (US)

( * ) Notice: Subject to any disclaimer, the term of this patent is extended or adjusted under 35 U.S.C. 154(b) by 220 days.

(21) Appl. No.: 18/502,430

(22) Filed: Nov. 6, 2023

(65) Prior Publication Data

US 2024/0148577 A1 May 9, 2024

Related U.S. Application Data

(60) Provisional application No. 63/382,405, filed on Nov. 4, 2022.

(51) Int. Cl.
*A61G 7/018* (2006.01)
*A61G 7/015* (2006.01)

(52) U.S. Cl.
CPC ............ *A61G 7/018* (2013.01); *A61G 7/015* (2013.01)

(58) Field of Classification Search
CPC ......... A47C 19/04; A61G 7/015; A61G 7/018
See application file for complete search history.

(56) References Cited

U.S. PATENT DOCUMENTS

| | | | | | |
|---|---|---|---|---|---|
| 1,394,331 | A * | 10/1921 | Monroe | ................. | A47C 19/04 5/183 |
| 10,813,807 | B2 * | 10/2020 | Bartley | .................. | A61G 7/015 |

(Continued)

OTHER PUBLICATIONS

Rodriquez, K., International Search Report and Written Opinion of the International Searching Authority for International Patent Application No. PCT/US2023/078796 dated Apr. 9, 2024, United States Patent Office.

*Primary Examiner* — Eric J Kurilla
(74) *Attorney, Agent, or Firm* — Spencer Fane LLP

(57) ABSTRACT

A medical bed frame may include a base frame, a pair of side members selectively movable laterally towards or away from the base frame, a first and second drive assembly each comprising: a first and second pair of cams configured to move the pair of side members, and a central linkage for rotating the first and second pair of cams, a first actuator operatively connected to the central linkage of the first drive assembly and the base frame, and a second actuator operatively connected to the central linkage of the second drive assembly and the base frame, wherein the first and second actuator are configured to selectively move the central linkage in one of a first direction and a second direction, whereby selective movement of the first actuator and the second actuator results in lateral movement of the pair of side members towards or away from the base frame.

9 Claims, 25 Drawing Sheets

(56) References Cited

U.S. PATENT DOCUMENTS

| | | | | |
|---|---|---|---|---|
| 2006/0021145 | A1* | 2/2006 | Hornbach .............. | A61G 7/015<br>5/618 |
| 2012/0073052 | A1* | 3/2012 | Meyer .................... | A61G 7/018<br>5/615 |
| 2012/0124746 | A1* | 5/2012 | Andrienko ............. | A61G 7/015<br>5/618 |
| 2013/0219382 | A1 | 8/2013 | Parsons et al. | |
| 2014/0033435 | A1* | 2/2014 | Jutras ................... | A47C 19/045<br>5/611 |
| 2015/0128347 | A1 | 5/2015 | Hutchison et al. | |
| 2015/0290061 | A1* | 10/2015 | Stafford ................... | A61G 7/05<br>5/600 |
| 2016/0220434 | A1* | 8/2016 | Li .......................... | A61G 7/015 |
| 2018/0214326 | A1 | 8/2018 | Lacasse et al. | |
| 2021/0315754 | A1 | 10/2021 | Gosselin et al. | |
| 2022/0218543 | A1 | 7/2022 | Roussy et al. | |

* cited by examiner

MEDICAL BED FRAME WITH ADJUSTABLE WIDTH AND LENGTH

PRIORITY DATA

This U.S. non-provisional patent application claims priority to U.S. Provisional Patent Application 63/382,405, filed on Nov. 4, 2022, which is hereby incorporated by reference herein.

BACKGROUND

1. Field of the Disclosed Subject Matter

This invention relates generally to medical beds frames and more particularly, but not necessarily exclusively, to medical bed frames with adjustable width and length.

BRIEF DESCRIPTION OF THE DRAWINGS

The present disclosed subject matter is described herein with reference to the following drawing figures, with greater emphasis placed on clarity rather than scale.

SUMMARY

Figure 1:
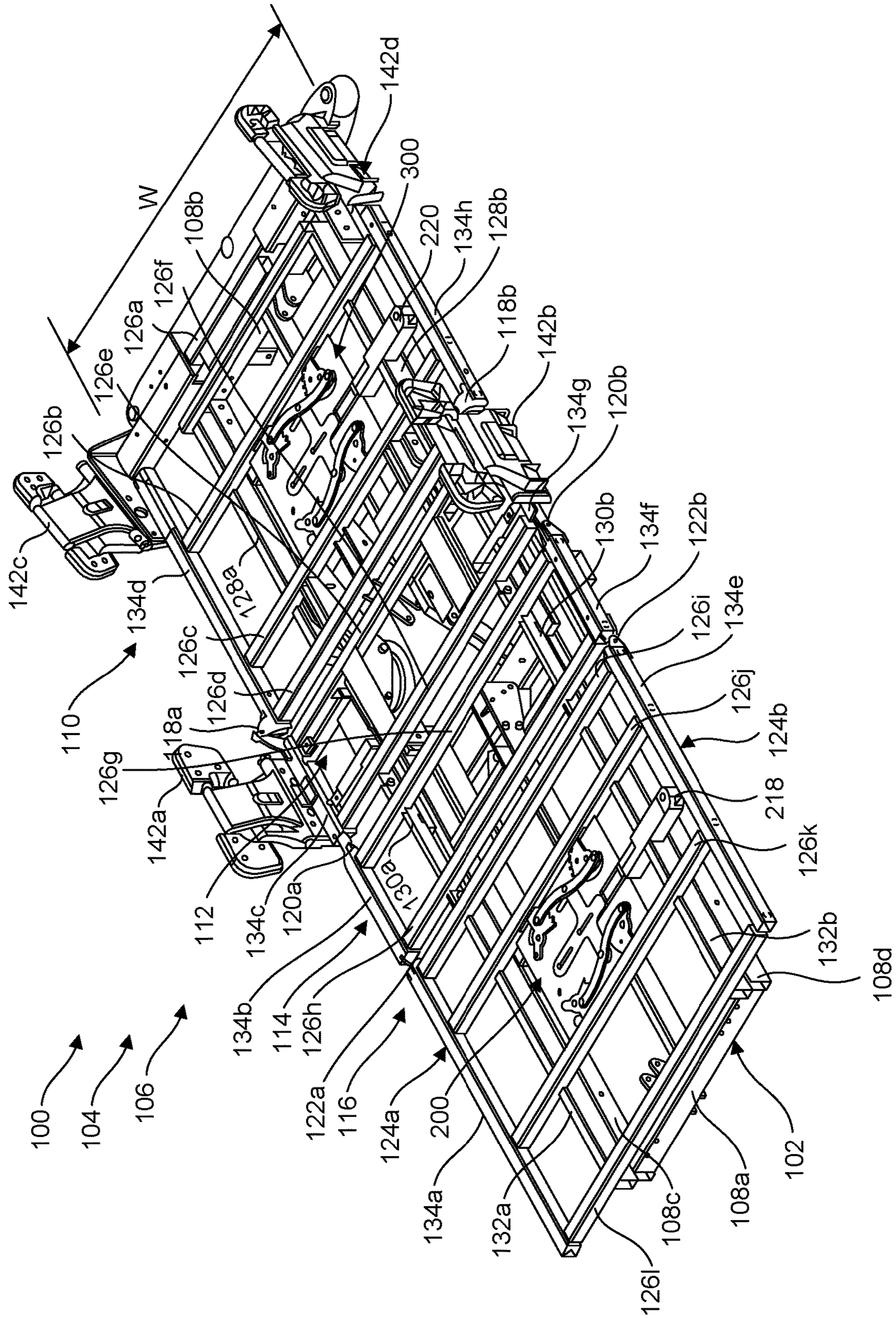
FIG. 1 is an isometric view of an embodiment of a medical bed frame.

In some aspects, the embodiments described herein relate to a medical bed frame including: a base frame having a foot section and a head section; a pair of side members selectively movable laterally towards or away from the base frame; a first drive assembly disposed proximate the foot section; a second drive assembly disposed proximate the head section, wherein the first drive assembly and the second drive assembly each including: a first pair of cams configured to move the pair of side members; a first linkage connected between the first pair of cams, the first linkage configured to rotate each cam of the first pair of cams in opposite directions; a second pair of cams configured to move the pair of side members; a second linkage connected between the second pair of cams, the second linkage configured to rotate each cam of the second pair of cams in opposite directions; and a central linkage connected between the first linkage and the second linkage; a first actuator operatively connected to the central linkage of the first drive assembly and the base frame; and a second actuator operatively connected to the central linkage of the second drive assembly and the base frame, wherein the first actuator and the second actuator are configured to selectively move the central linkage in one of a first direction and a second direction opposite the first direction, whereby selective movement of the first actuator and the second actuator results in lateral movement of the pair of side members towards or away from the base frame.

In some aspects, the embodiments described herein relate to a medical bed frame, further including: a third drive assembly disposed proximate a head section, the third drive assembly including: a third pair of cams configured to engage the pair of side members; a third linkage connected between the third pair of cams, the third linkage configured to rotate each cam of the third pair of cams in opposite directions; and a third actuator operatively connected to the third linkage and the base frame to selectively move the central linkage in one of a first direction and a second direction opposite the first direction; whereby selective movement of the third actuator results in lateral movement of the pair of side members towards or away from a central section.

In some aspects, the embodiments described herein relate to a medical bed frame, wherein each of the first pair of cams, the second pair of cams, and the third pair of cams include a plurality of teeth configured to engage a plurality of slots disposed on one or more of a plurality of sliding members.

In some aspects, the embodiments described herein relate to a medical bed frame, wherein the plurality of sliding members are partially disposed within a plurality of lateral members.

In some aspects, the embodiments described herein relate to a medical bed frame, wherein a plurality of side elements are connected to the plurality of sliding members via a plurality of pins, wherein the plurality of pins are offset about 90-degrees between adjacent members of the plurality of sliding members.

In some aspects, the embodiments described herein relate to a medical bed frame including: a base frame having a foot section and a head section; a pair of side members selectively movable laterally towards or away from the base frame; a first drive assembly disposed proximate the foot section; a second drive assembly disposed proximate the head section, wherein the first drive assembly and the second drive assembly each including: a first pair of cams configured to move the pair of side members; a first linkage connected between the first pair of cams, the first linkage configured to rotate each cam of the first pair of cams in opposite directions; a second pair of cams configured to move the pair of side members; a second linkage connected between the second pair of cams, the second linkage configured to rotate each cam of the second pair of cams in opposite directions; and a central linkage connected between the first linkage and the second linkage; a third drive assembly disposed proximate a head section, the third drive assembly including: a third pair of cams configured to move the pair of side members; and a third linkage connected between the third pair of cams, the third linkage configured to rotate each cam of the third pair of cams in opposite directions; a cable manifold operatively connected to a manifold actuator; and a plurality of cables operatively connected to the cable manifold at a first end and one of the first drive assembly, the second drive assembly and the third drive assembly at a second end, wherein the manifold actuator is configured to selectively move the plurality of cables in one of a first direction and a second direction opposite the first direction; whereby selective movement of the manifold actuator results in lateral movement of the pair of side members towards or away from the base frame.

In some aspects, the embodiments described herein relate to a medical bed frame, wherein each of the first pair of cams, the second pair of cams, and the third pair of cams include a plurality of teeth configured to engage a plurality of slots disposed on a plurality of sliding members.

In some aspects, the embodiments described herein relate to a medical bed frame, wherein the plurality of sliding members are partially disposed within a plurality of lateral members.

In some aspects, the embodiments described herein relate to a medical bed frame, wherein a plurality of side elements are connected to the plurality of sliding members via a plurality of pins, wherein the plurality of pins are offset about 90-degrees between adjacent members of the plurality of sliding members.

In some aspects, the embodiments described herein relate to a medical bed frame including: an extendable frame slidably connected to a foot section of the medical bed frame; and a multi-cam drive assembly connected to the foot section, the multi-cam drive assembly including: a linear drive mechanism connected to the foot section; a drive member connected to the linear drive mechanism; wherein the drive member including a set of opposing slots configured to engage and rotate a bottom pair of cams; a top pair of cams connected to the bottom pair of cams; whereby rotation of the bottom pair of cams rotates the top pair of cams; and a pair of extension members connected to the foot section, the pair of extension members having a plurality of slots configured to engage the top pair of cams, whereby rotation of the top pair of cams urges the pair of extension members to move the foot section.

In some aspects, the embodiments described herein relate to a medical bed frame, wherein each cam of the bottom pair of cams having a first radius, wherein each cam of the top pair of cams having a second radius, the first radius is less than the second radius.

In some aspects, the embodiments described herein relate to a medical bed frame, wherein the linear drive mechanism includes a linear actuator.

In some aspects, the embodiments described herein relate to a medical bed frame including: an extendable frame slidably connected to a foot section of the medical bed frame; and a multi-cam drive assembly connected between the foot section and the extendable frame, the multi-cam drive assembly including: a slide plate assembly slidably connected to the foot section, the slide plate assembly having a pair of gear assemblies engaging a pair of extension members; and a linear drive mechanism connected between the foot section and the slide plate assembly, whereby actuation of the linear drive mechanism urges rotation of the pair of gear assemblies resulting in movement of the pair of extension members.

In some aspects, the embodiments described herein relate to a medical bed frame, wherein each of the pair of gear assemblies include a toothed wheel connected to a toothed cam along a third central axis.

In some aspects, the embodiments described herein relate to a medical bed frame, wherein the slide plate assembly includes a pair of side walls having a plurality of apertures linearly disposed through each of the pair of side walls.

In some aspects, the embodiments described herein relate to a medical bed frame, wherein the toothed wheel includes a third radius, wherein the toothed cam including a fourth radius, the third radius is less than the fourth radius.

In some aspects, the embodiments described herein relate to a medical bed frame, wherein the pair of extensions members include a plurality a slots configured to engage the toothed cam.

In some aspects, the embodiments described herein relate to a medical bed frame, wherein the pair of extension members are configured to slide within a pair of hollow support members.

In some aspects, the embodiments described herein relate to a method of adjusting a width of a medical bed frame including the steps of: providing a patient support assembly including: a pair of side members having plurality of sliding members, wherein the plurality of sliding members are slideably engaged with a plurality of lateral members, and a pair of cams in rotational engagement with the plurality of sliding members; and rotating a pair of cams in opposite directions, thereby moving the one or more of the plurality of sliding members and pair of side members in opposite directions and adjusting the width of the medical bed frame.

In some aspects, the embodiments described herein relate to a method 19, further including the step of providing an actuator operatively connected to the pair of cams to selectively move the pair of side members in one of a first direction and a second direction opposite the first direction.

In some aspects, the embodiments described herein relate to a method 19, further including the step of providing a cable operatively connected to the pair of cams and a cable manifold, whereby movement of the cable by the cable manifold selectively moves the pair of side members in one of a first direction and a second direction opposite the first direction.

In some aspects, the embodiments described herein relate to a method of adjusting a length of a medical bed frame including the steps of: providing a medical bed frame having an extendable assembly, the extendable assembly including: a multi-cam drive assembly connected to a foot section, the multi-cam drive assembly including: a linear drive mechanism; a slide plate assembly connected to the linear drive mechanism, the slide plate assembly having a plurality of apertures; and a pair of gear assemblies in rotational engagement with the plurality of apertures, wherein each of the pair of gear assemblies include a toothed wheel and a toothed cam; a pair of hollow support members; a pair of extension members having a plurality of slots, the pair of extension members at least partially disposed within the pair of extension members, the toothed wheels in rotational engagement with plurality of slots; and an extendable frame connected to the pair of extension members, whereby adjustment of the linear drive mechanism rotates the toothed wheels and toothed cams resulting in linear movement of the pair of extension members within the pair of hollow support members; and adjusting the linear drive mechanism towards a foot end of the medical bed frame; thereby moving the pair of extension members and the extendable frame away from the foot section.

In some aspects, the embodiments described herein relate to a method 22, further including the step of adjusting the linear drive mechanism towards a head end of the medical bed frame; thereby moving the pair of extension members and the extendable frame towards the foot section.

In some aspects, the embodiments described herein relate to a method of adjusting a width of a medical bed frame including the steps of: providing a patient support assembly including: a pair of side members having a plurality of sliding members, wherein the plurality of sliding members are slideably engaged with a plurality of lateral members; and a pair of multi-cam assemblies connected to the plurality of sliding members, each of the multi-cam assemblies including: a linear drive mechanism; a drive member connected to the linear drive mechanism, the drive member having a pair of opposing slots; a bottom pair of cams in rotational engagement with the pair of opposing slots; and a top pair of cams connected to the bottom pair of cams, the top pair of cams in rotational engagement with the plurality of sliding members, whereby adjustment of the linear drive mechanism rotates the pair of bottom cams and the pair of top cams resulting in linear movement of the plurality of sliding members; and adjusting the linear drive mechanisms, thereby moving the pair of side members in opposite directions and adjusting the width of the medical bed frame.

DETAILED DESCRIPTION

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Although the disclosed subject matter has been disclosed with reference to various particular embodiments, it is understood that equivalents may be employed, and substitutions made herein without departing from the scope of the disclosed subject matter as recited in the claims.

Certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

Referring to the drawings, FIG. 1 shows an embodiment of a medical bed frame 100 having a base frame 102, a patient support assembly 104, and an expansion system 106. The base frame 102 may include a plurality of structural frame members 108*a-d* constructed of ridged materials and configured to support the patient support assembly 104. In the illustrated embodiment, the patient support assembly 104 may include a head section 110, an upper core section 112, a lower core section 114, and a foot section 116. The head section 110 is pivotally connected to the upper core section 112 via a first pair of hinges 118*a-b*. The head section 110 may rotate about the pair of first hinges 118*a-b* in order to articulate the head section 110 away from the base frame 102. A head section actuator (not shown) may be connected between the base frame 102 and the head section 110; whereby operation of the head section actuator moves the head section 110 about the first pair of hinges 118*a-b*. The upper core section 112 may be non-pivotally connected to the base frame 102. The lower core section 114 may be pivotally connected to the upper core section 112 via a second pair of hinges 120*a-b*. The lower core section 114 may rotate about the second pair of hinges 120*a-b* in order to articulate the lower core section 114 away from the base frame 102. A lower core section actuator (not shown) may be connected between the base frame 102 and the lower core section 114; whereby operation of the lower section actuator moves the lower core section 114 about the second pair of hinges 120*a-b*. The lower core section 114 and foot section 116 may be connected via a third pair of hinges 122*a-b*, whereby rotation of the lower core section 114 about the upper core section 112 may articulate the foot section 116 about the lower core section 114 and may move the third pair of hinges 122 away from the base frame 102.

The patient support assembly 104 may comprise a plurality of lateral members 126*a*-1 configured to provide rigidity to the patient support assembly 104. The lateral members 126*a-d* of the head section 110 are connected between a pair of head support members 128*a-b*. The lateral members 126*e-f* of the upper core section 112 are connected to the base frame 102. The lateral members 126*g-h* of the lower core section 114 are connected between a pair of lower core support members 130*a-b*. The lateral members 126*i*-1 of the foot section 116 are connected between a pair of foot support members 132*a-b*. The plurality of lateral members 126*a*-1 are generally perpendicular to the structural frame members 108*c-d.*

The patient support assembly 104 may include a pair of side members 124*a-b* selectively movable laterally towards or away from the base frame 102 in order to adjust a width W of the medical bed frame 100 between about 35 inches to about 48 inches. It is advantageous to be able to pass the medical bed frame 100 through a door frame opening and then adjust the width W of the medical bed frame 100 to accommodate a patient. The side member 124*a* may include a plurality of side elements 134*a-d* connected to one of the first pair of hinges 118*a*, one of the second pair of hinges 120*a*, and one of the third pair of hinges 122*a*. In a similar manner, the side member 124*b* may include a plurality of side elements 124*e-h* connected to one of the first pair of hinges 118*b*, one of the second pair of hinges 120*b*, and one of the third pair of hinges 122*b*.

In an embodiment, the medical bed frame 100 may include a plurality of handrail brackets 142*a-d* for support of a plurality of handrails (not shown). The plurality of handrail brackets 142*a-d* may be connected to patient support assembly 104, and, in some embodiments, articulate with head section 110.

A patient support surface (not shown) may be connected to an upper side of patient support assembly 104 in order to support a patient. The patient support surface may be configured to selectively move in one of a first direction and a second direction opposite the first direction in response to the movement of the pair of side members 124*a-b*.

Figure 2:
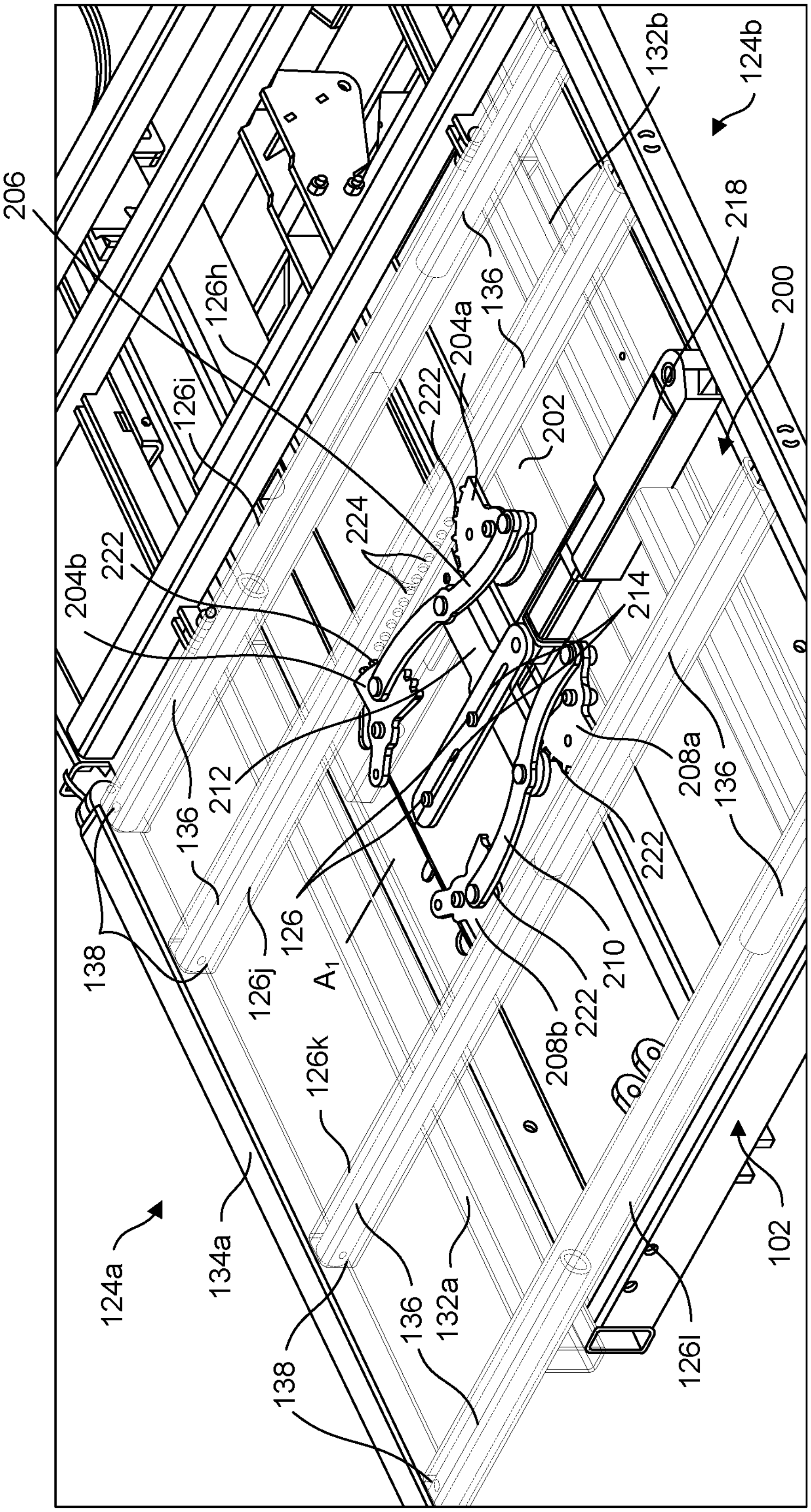
FIG. 2 is an isometric view of an embodiment of a first drive assembly.
Figure 3:
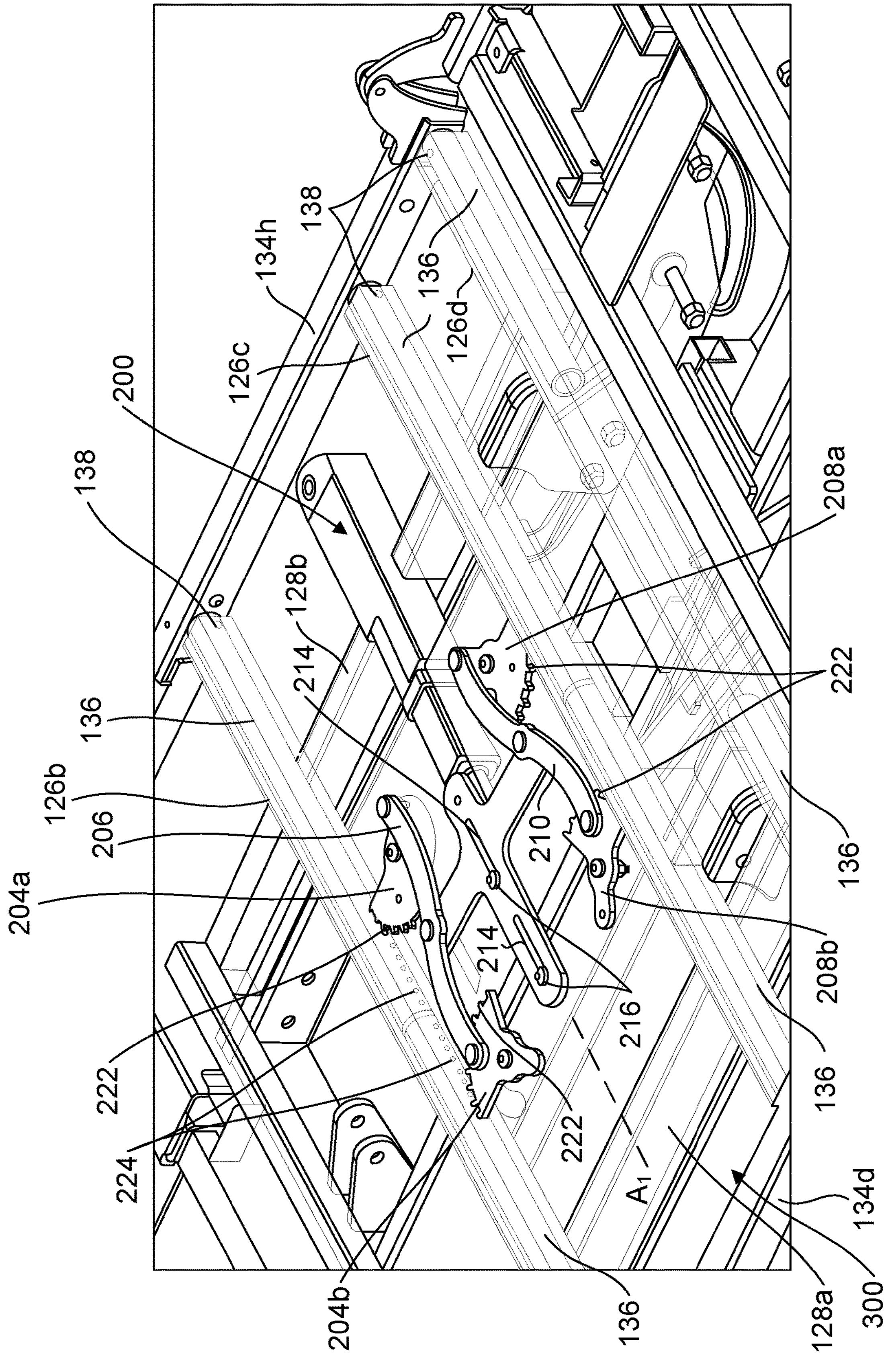
FIG. 3 is an isometric view of an embodiment of a second drive assembly.

Referring to FIG. 2 and FIG. 3, in an embodiment, the patient support assembly 104 may further include a plurality of sliding members 136 connected to the plurality of side elements 134*a-h*. The plurality of sliding members 136 may be configured to slide within the plurality of lateral members 126*a*-1. In an embodiment, the plurality of sliding members 136 comprise hollow tubes, or other shapes known in the art. A plurality of pins 138 may be used to connect the plurality of side elements 134*a-h* to the plurality of sliding members 136. The orientation of the plurality of pins may be offset 90-degrees between adjacent members of the plurality of sliding members 136 in order to avoid binding and/or seizing of the plurality of sliding members 136 within the plurality of lateral members 126*a*-1.

In an embodiment, the expansion system 106 may include a first drive assembly 200, a second drive assembly 300, and third drive assembly 400, each of the drive assemblies (200, 300, 400) configured to selectively move the plurality of side elements 134*a-h* in one of a first direction and a second direction opposite the first direction.

In an embodiment, the first drive assembly 200 may be disposed proximate the foot section 116 between the lateral members 126*j* and 126*k*. The second drive assembly 300 may be disposed proximate the head section 110 between the lateral members 126*b* and 126*c*. Each of the first drive assembly 200 and the second drive assembly 300 may include: a plate 202 connected between the lateral members; a first pair of cams 204*a-b* pivotally connected to a plate 202, wherein each cam of the first pair of cams 204*a-b* is configured to move at least one of the plurality of sliding members 136; and a first linkage 206 connected between the first pair of cams 204*a-b*, wherein the first linkage 206 is configured to rotate each cam of the first pair of cams 204*a-b* in opposite directions. Each of the first drive assembly 200 and the second drive assembly 300 may further include: a second pair of cams 208*a-b* pivotally connected to the plate 202, wherein each cam of the second pair of cams 208*a-b* is configured to move one of the plurality of sliding members 136; and a second linkage 210 connected between the second pair of cams 208*a-b*, wherein the second linkage 210 is configured to rotate each cam of the second pair of cams 208*a-b* in opposite directions. In an embodiment, a central linkage 212 may be pivotally connected between the first linkage 206 and the second linkage 208, whereby lateral movement of the central linkage 212 simultaneously rotates the first pair of cams 204*a-b* and the second pair of cams 208*a-b*. The central linkage 212 is configured to move along a first central axis $A_1$. The central linkage 212 may include a pair of slots 214*a-b* being in alignment with each other. A pair of studs 216*a-b* may extend outwardly from plate 202 and extend though the pair of slots 214*a-b* in order to restrain movement of the central linkage 212 along the first central axis $A_1$.

In an embodiment, a first actuator 218 may be operatively coupled to the central linkage 212 of the first drive assembly 200 and one the pair of foot support members 132*a-b* to selectively move the central linkage 212 in one of a first direction and a second direction opposite the first direction; whereby selective movement of the first actuator 218 results in lateral movement of the pair of side members 124*a-b* towards or away from the base frame 102. In a similar manner, a second actuator 220 may be operatively coupled to the central linkage 212 of the second drive assembly 300 and one of the pair of head support members 128*a-b* to selectively move the central linkage 212 in one of a first direction and a second direction opposite the first direction; whereby selective movement of the second actuator 220 results in lateral movement of the pair of side members 124*a-b* towards or away from the base frame 102.

In an embodiment, each of the first pair of cams 204*a-b* and the second pair of cams 208*a-b* comprise a plurality of teeth 222 configured to engage a plurality of slots 224 disposed on one or more of the plurality of sliding members 136. The rotation of the first pair of cams 204*a-b* and the second pair of cams 208*a-b* moves one or more of the plurality of sliding members 136 an equidistance in one of a first direction and a second direction opposite the first direction.

Figure 4:
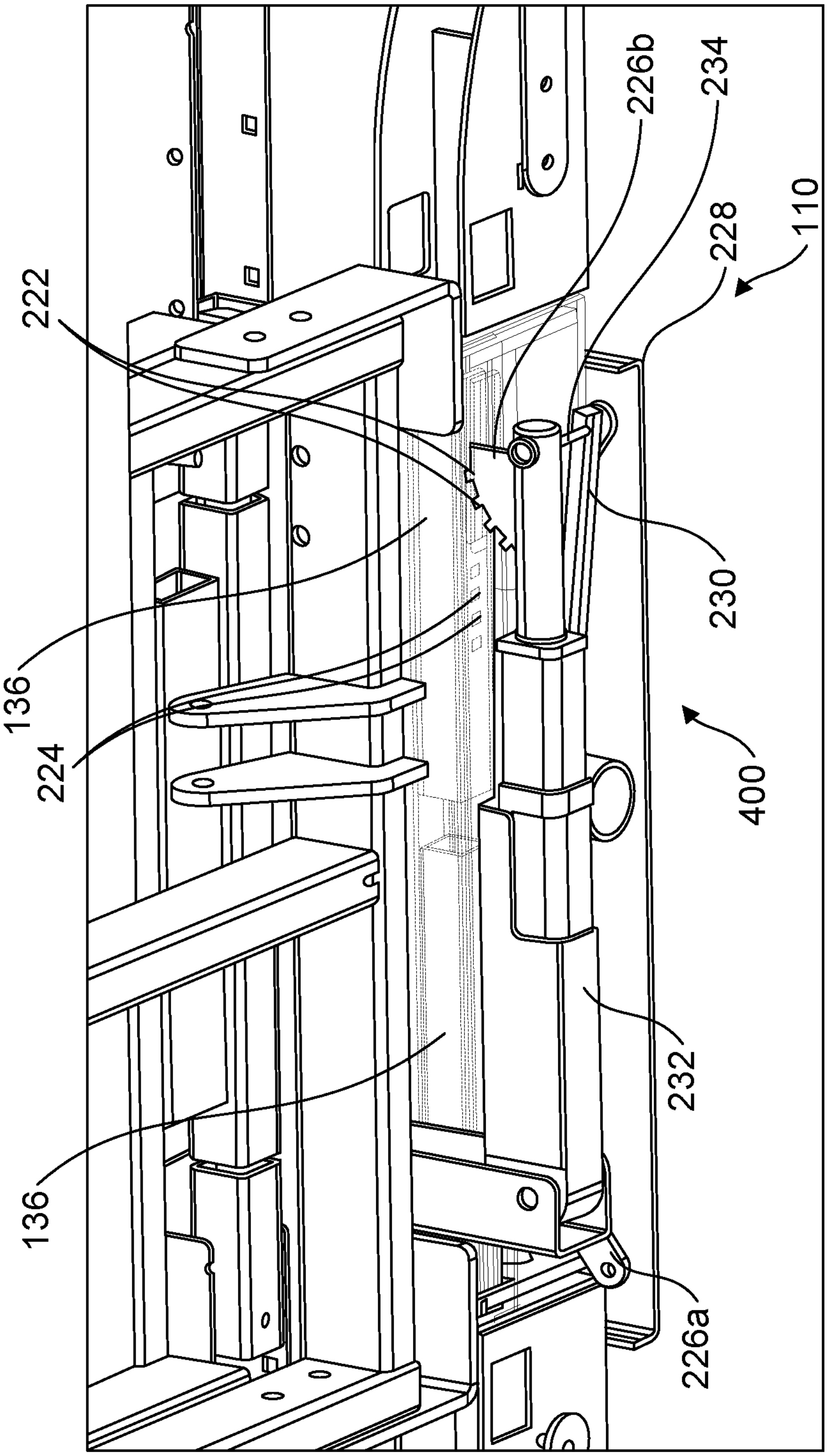
FIG. 4 is an isometric view of an embodiment of a third drive assembly.
Figure 5:
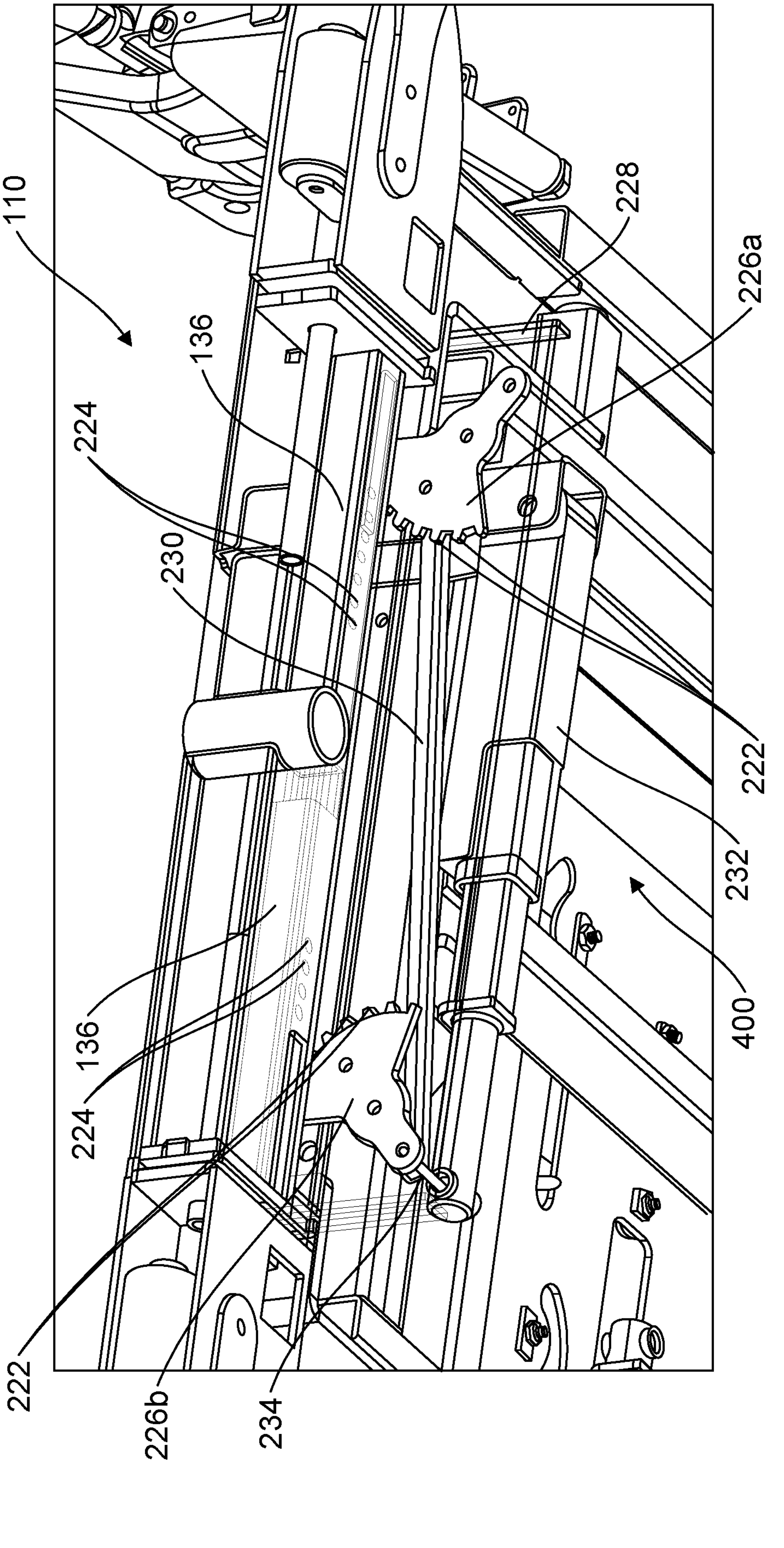
FIG. 5 is an isometric view of an embodiment of the third drive assembly.

Referring to FIG. 4 and FIG. 5, in an embodiment, the expansion system 106 may include a third drive assembly 400 disposed proximate the head section 110. The third drive assembly 400 may include a third pair of cams 226*a-b* pivotally connected to a bracket 228 connected to the head section 110 and extending downwardly from the head section 110. The third pair of cams 226*a-b* may be configured to move two of the plurality of sliding members 136. A third linkage 230 is connected between each cam of the third pair of cams 226*a-b*; whereby rotation of cam 226*a* results in opposite rotation of cam 226*b*, and vis versa. In an illustrated embodiment, a third actuator 232 is pivotally connected to one of the third pair of cams 226*a-b* by means of a fourth linkage 234. The lateral movement of the third actuator 232 rotates the cams of the third pair of cams 226*a-b* in opposite directions. The third pair of cams 226*a-b* may include a plurality of teeth 222 configured to engage a plurality of slots 224 disposed upon two of the plurality of sliding members 136, whereby rotation of the third pair of cams 226*a-b* results in lateral movement of two of the plurality of sliding members 136 towards or away from the base frame 102.

Figure 6:
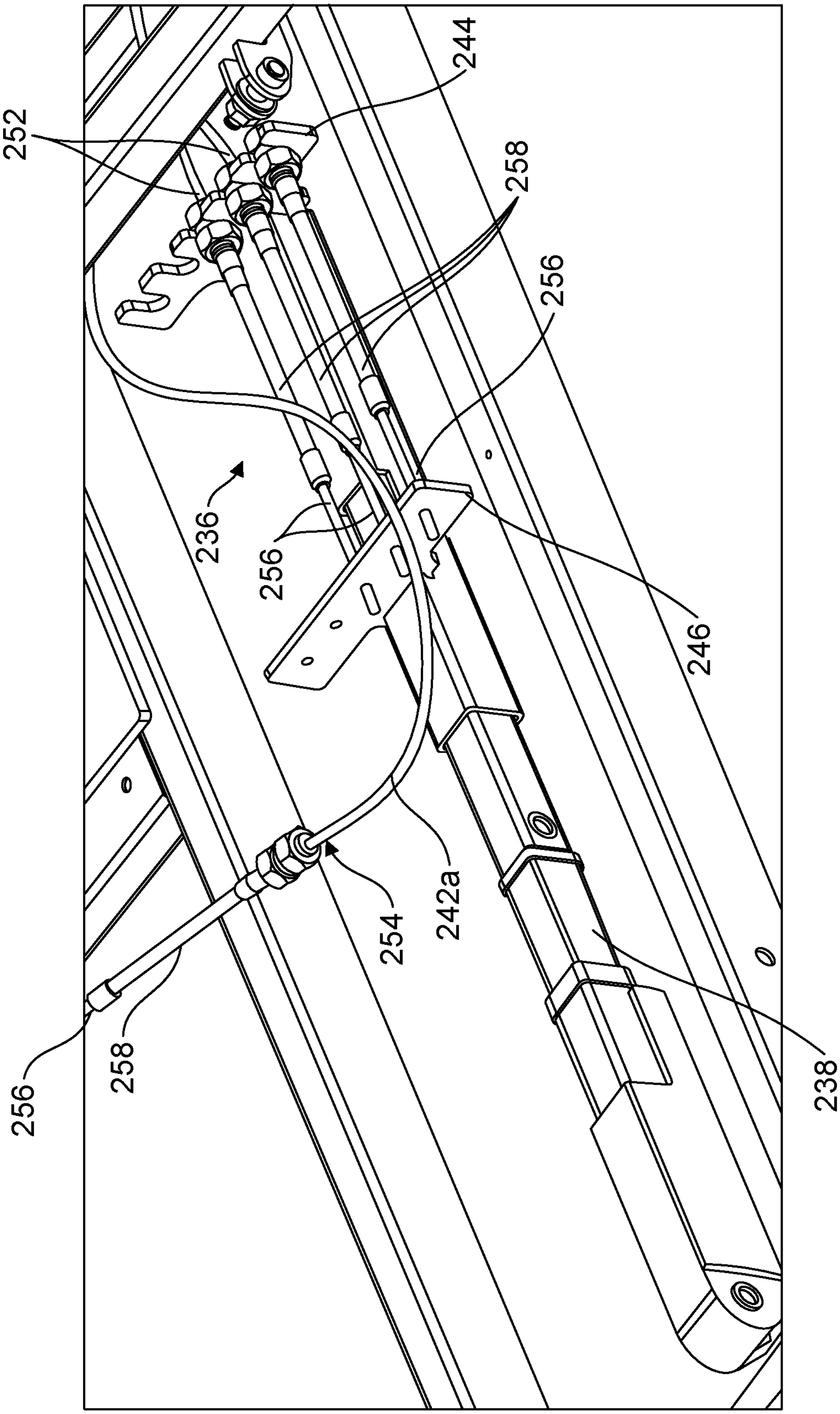
FIG. 6 is an isometric view of an embodiment of cable manifold.

Referring to FIG. 6, in an illustrated embodiment, the expansion system 106 may include a cable manifold 236 operatively connected to a manifold actuator 238. The cable manifold 236 is configured to move a plurality of cables 240*a-c* through a plurality of cable sheaths 242*a-c*. In an embodiment, the plurality of cables 240*a-c* are operatively connected to the first drive assembly 200, the second drive assembly 300, and third drive assembly 400. The cable manifold 236 may include a fixed bracket 244 in parallel arrangement with a movable bracket 246, wherein the movable bracket 246 is operatively connected to the manifold actuator 238. The manifold actuator 238 is configured to move the movable bracket 246 relative to the fixed bracket 244.

The plurality of cables 240*a-c* may include a first cable end 248 and a second cable end 250 opposite the first cable end 248. The plurality of cables sheaths 242*a-c* may include a first sheath end 252 and a second sheath end 254 opposite the first sheath end 252. In an embodiment, the first cable end 248 and the second cable end 250 may each be connected to one of a plurality of rods 256 which are slideably secured within one of a plurality of cylinders 258. The plurality of cylinders 258 may be connected to the first sheath end 252 and the second sheath end 254.

In an embodiment, the plurality of rods 256 connected to the first cable end 248 of the plurality of cables 240*a-c* may be operative connected to the movable bracket 246. The plurality of cylinders 258 connected to the first sheath end 252 of the plurality of cable sheaths 242*a-c* may be connected to the fixed bracket 244, whereby movement of movable bracket 246, via the manifold actuator 238, moves the plurality of cables 240*a-c* through the plurality of cable sheaths 242*a-c*. The fixed bracket 244 and movable bracket 246 are generally parallel to each other, thereby movement of the fixed bracket results in equal movement of each of the plurality of cables 240*a-c* within the plurality of cable sheaths 242*a-c*.

Figure 7:
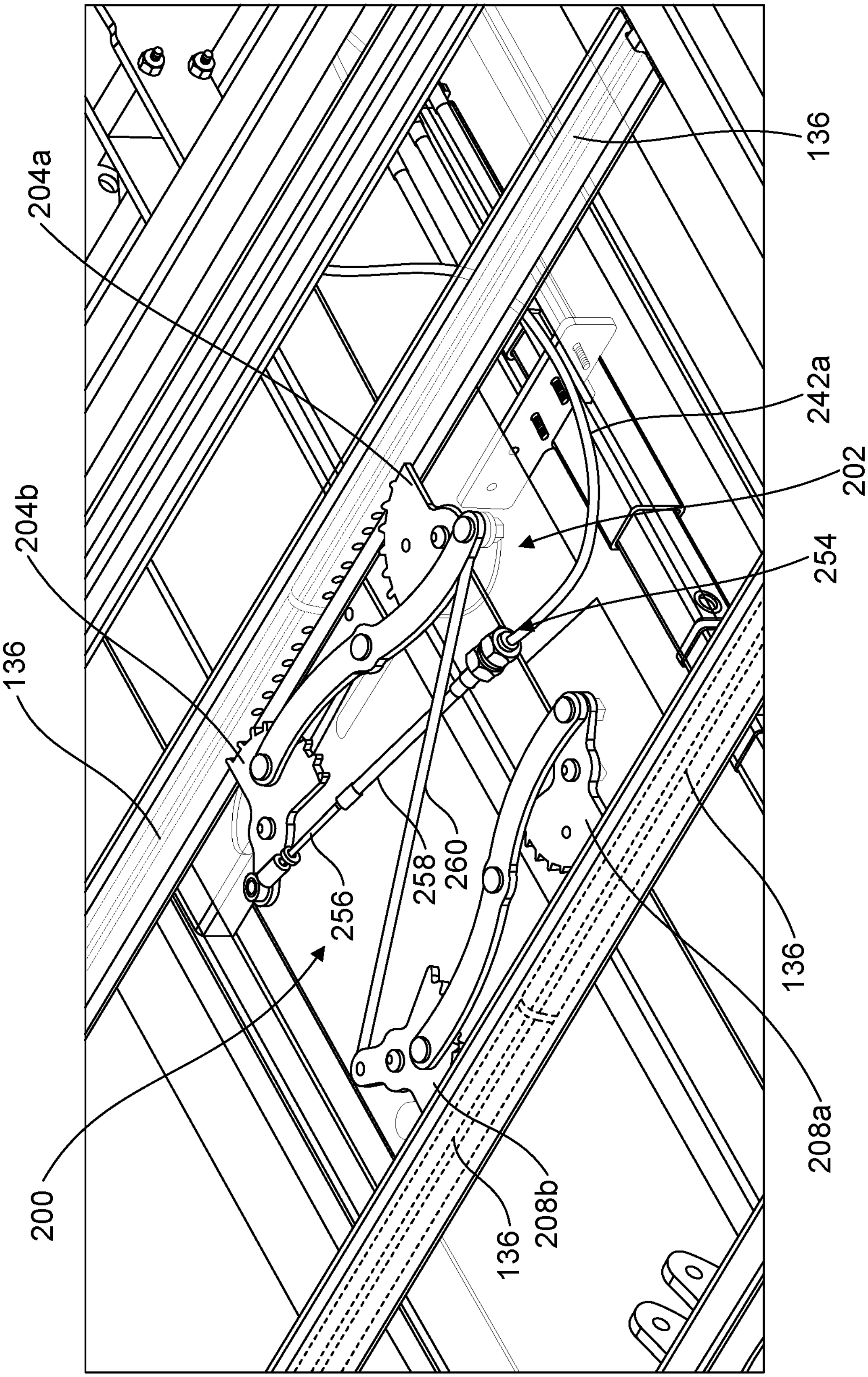
FIG. 7 is an isometric view of an embodiment of the first drive assembly.

In an embodiment, the plurality of cable sheaths 242*a-c* may be routed from the cable manifold 236 to the first drive assembly 200, the second drive assembly 300, and third drive assembly 400. At the first drive assembly 200, as illustrated in FIG. 7, one of the plurality of cylinders 258 connected to the second sheath end 254 may be connected to plate 202 of the first drive assembly 200. One rod of the plurality of rods 256 may be pivotally connected to cam 204*b* of the first pair of cams 204*a-b*. A first cross linkage 260 may be pivotally connected between the cam 204*a* and the cam of the second pair of cams. The first cross linkage 260 is configured to rotate the cam 204*a* in an opposite direction of the cam 208*b*. Movement of the manifold actuator 238 (shown in FIG. 6) moves one of the plurality of rods connected to the cam 204*b* in a first direction or a second direction resulting in lateral movement of the plurality of sliding members 136 through engagement with the first pair of cams 204*a-b* and the second pair of cams 208*a-b*, thereby adjusting the width W between the pair of side members 124*a-b* (not shown).

Figure 8:
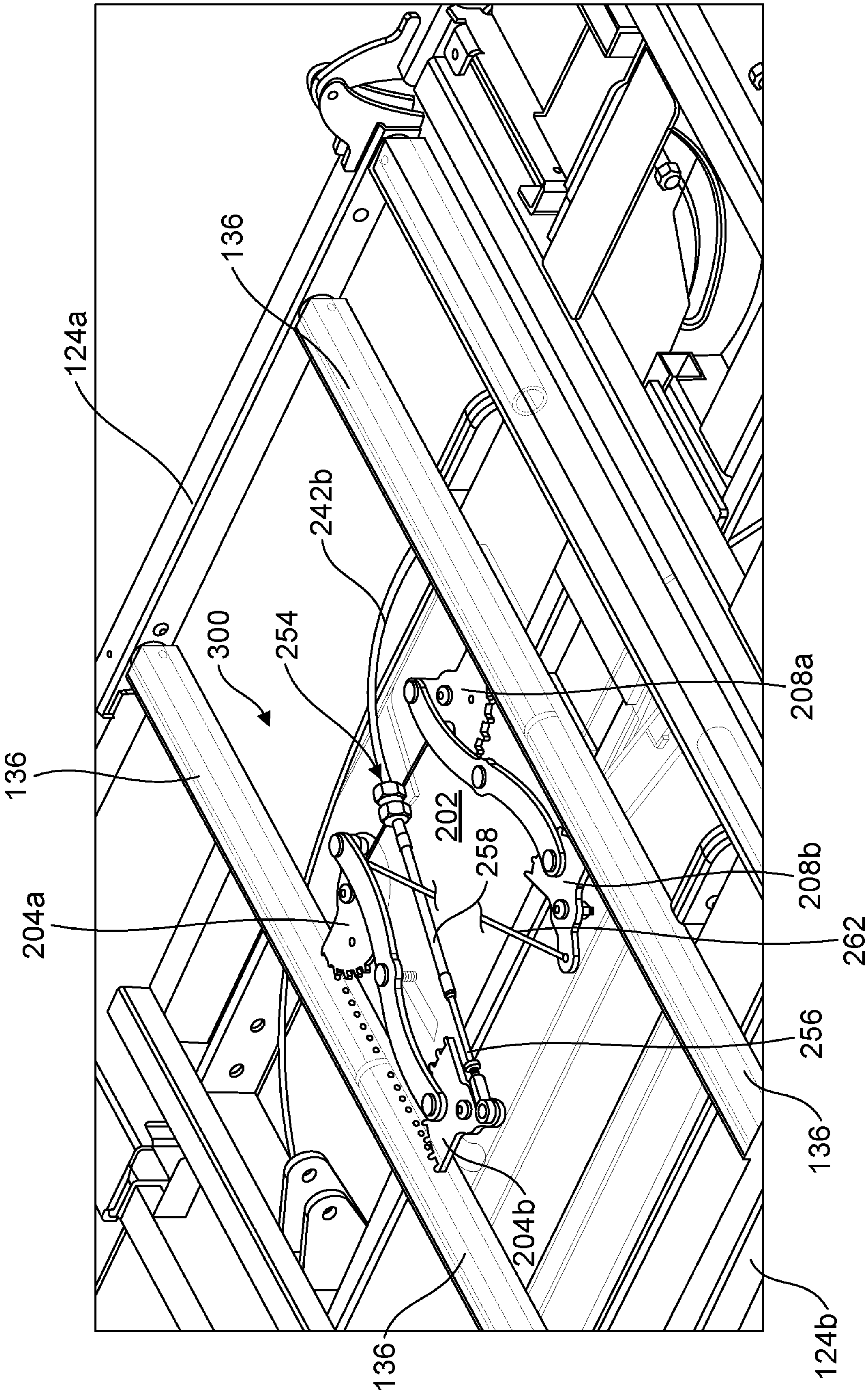
FIG. 8 is an isometric view of an embodiment of the second drive assembly.

Referring to FIG. 8, in an embodiment, one of the plurality of cylinders 258 may be connected to the plate 202 of the second drive assembly 300. One of the plurality of rods 256 may be pivotally connected to cam 204*b* of the first pair of cams 204*a-b*. A second cross linkage 262 may be pivotally connected between the cam 204*a* and the cam 208*b*. The second cross linkage 262 is configured to rotate the cam 204*a* in an opposite direction of cam 208*b*. Movement of the manifold actuator 238 (shown in FIG. 6) moves the one of the plurality of rods 256 connected to the cam 204*b* in a first direction or a second direction resulting in lateral movement of the plurality of sliding members 136 through engagement with the first pair of cams 204*a-b* and the second pair of cams 208*a-b*, thereby adjusting the width W between the pair of side members 124*a-b*.

Figure 9:
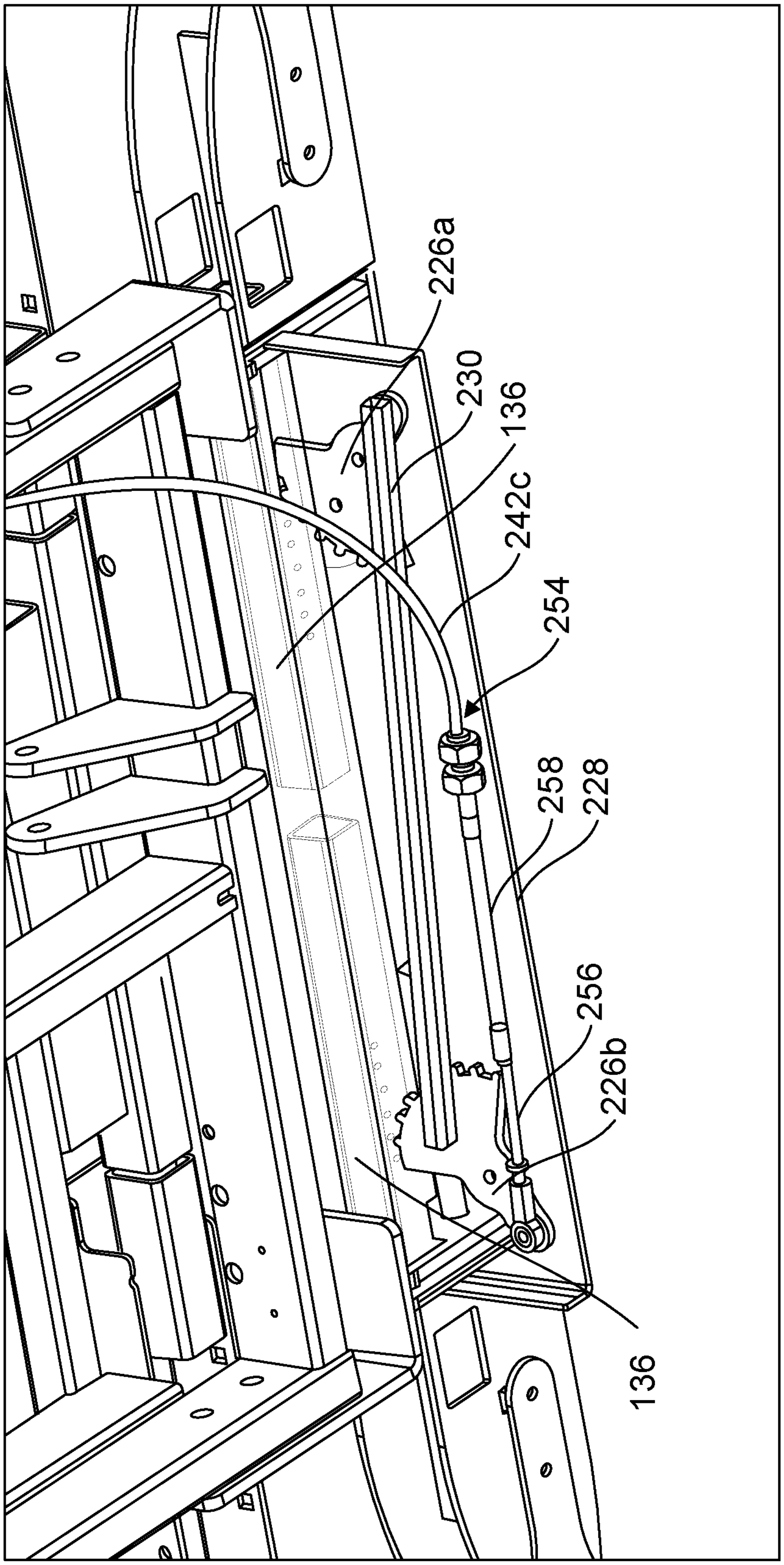
FIG. 9 is an isometric view of an embodiment of the third drive assembly.

Referring to FIG. 9, in an illustrated embodiment, one of the plurality of cylinders 258 may be connected to the bracket 228 of the third drive assembly 400. One of the plurality of rods 256 may be pivotally connected to the cam 226*a* of the third pair of cams 226*a-b*. The third linkage 230 may be pivotally connected between cam 226*a* and cam 226*b*. The third linkage 230 is configured to rotate the cam 226*a* in an opposite direction of the cam 226*b*. Movement of the manifold actuator 238 (shown in FIG. 6) moves one of the plurality of rods 256 connected to the cam 226*b* in a first direction or a second direction resulting in lateral movement of the plurality of sliding members 136 through engagement with the third pair of cams 226*a-b*, thereby adjusting the width W between the pair of side members 124*a-b* (not shown).

Figure 10:
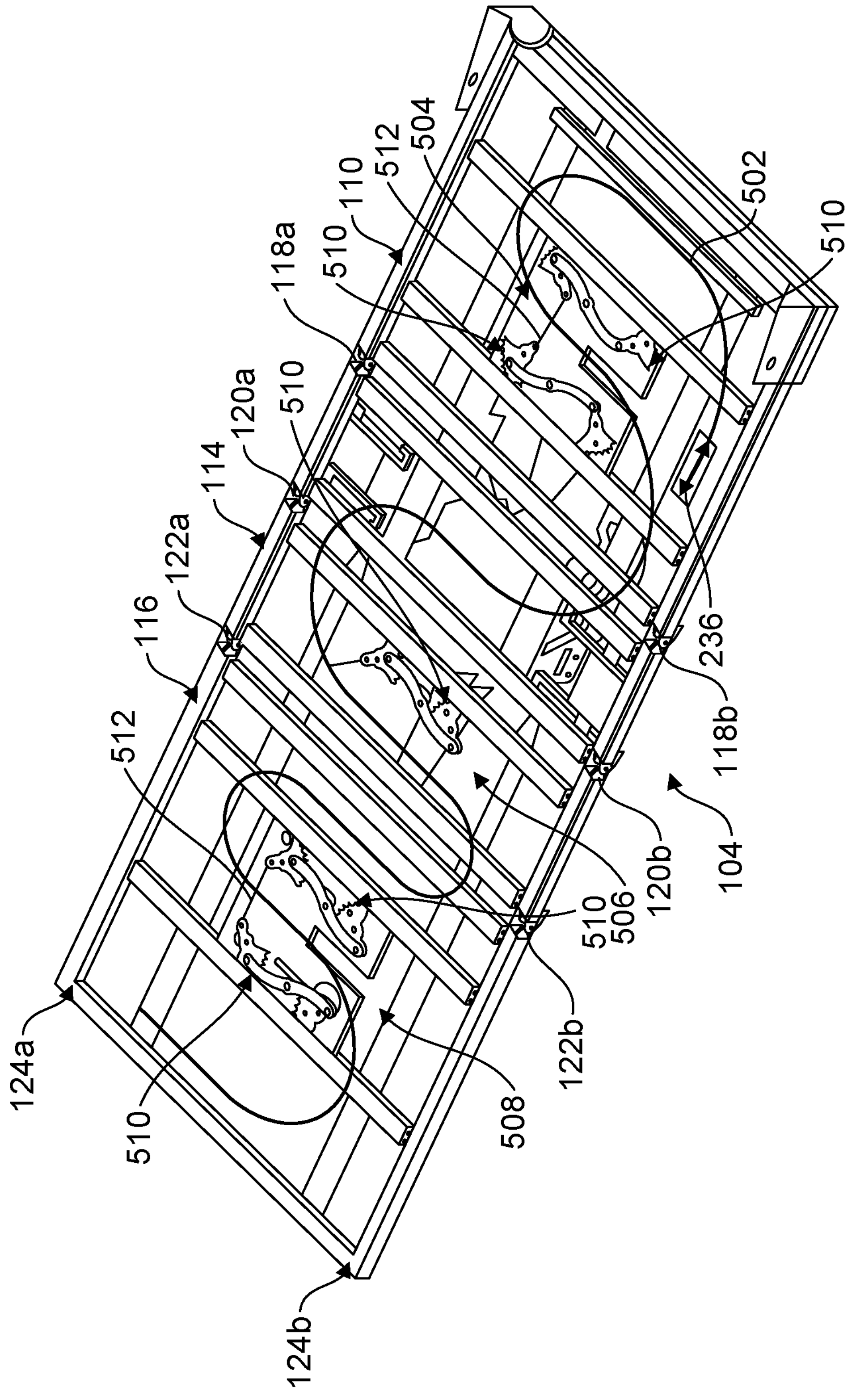
FIG. 10 is an isometric view of an embodiment of a patient support assembly.

Referring to FIG. 10, in an embodiment, a single cable 502 may be operatively connected between the cable manifold 236, a fourth drive assembly 504, a fifth drive assembly 506, and a sixth drive assembly 508. In an embodiment, the fourth drive assembly 504, the fifth drive assembly 506, and the sixth drive assembly 508 may include one or more sixth pair of cams 510 configured to selectively move the pair of side members 124*a-b* in response to movement of the single cable 502 at the cable manifold 236. A cross member 512 may be included between two of the sixth pair of cams 510 to rotate the two of the sixth pair of cams 510 an equidistance. In an embodiment, the fourth drive assembly 504 and the sixth drive assembly 508 may include two of the sixth pair of cams 510 disposed opposite of each other.

In an embodiment, the single cable 502 may be positioned along the patient support assembly 104 in a manner to avoid interference with the patient support assembly 104 when the head section 110, lower core section 114, and foot section 116 are rotated about the first pair of hinges 118*a-b*, the second pair of hinges 120*a-b*, and the third pair of hinges 122*a-b*. A predetermined length of the single cable 502 may be provided to avoid excessive tension or crushing forces to the single cable 502 when the patient support assembly is articulated about the first pair of hinges 118*a-b*, the second pair of hinges 120*a-b*, and the third pair of hinges 122*a-b*.

Figure 11:
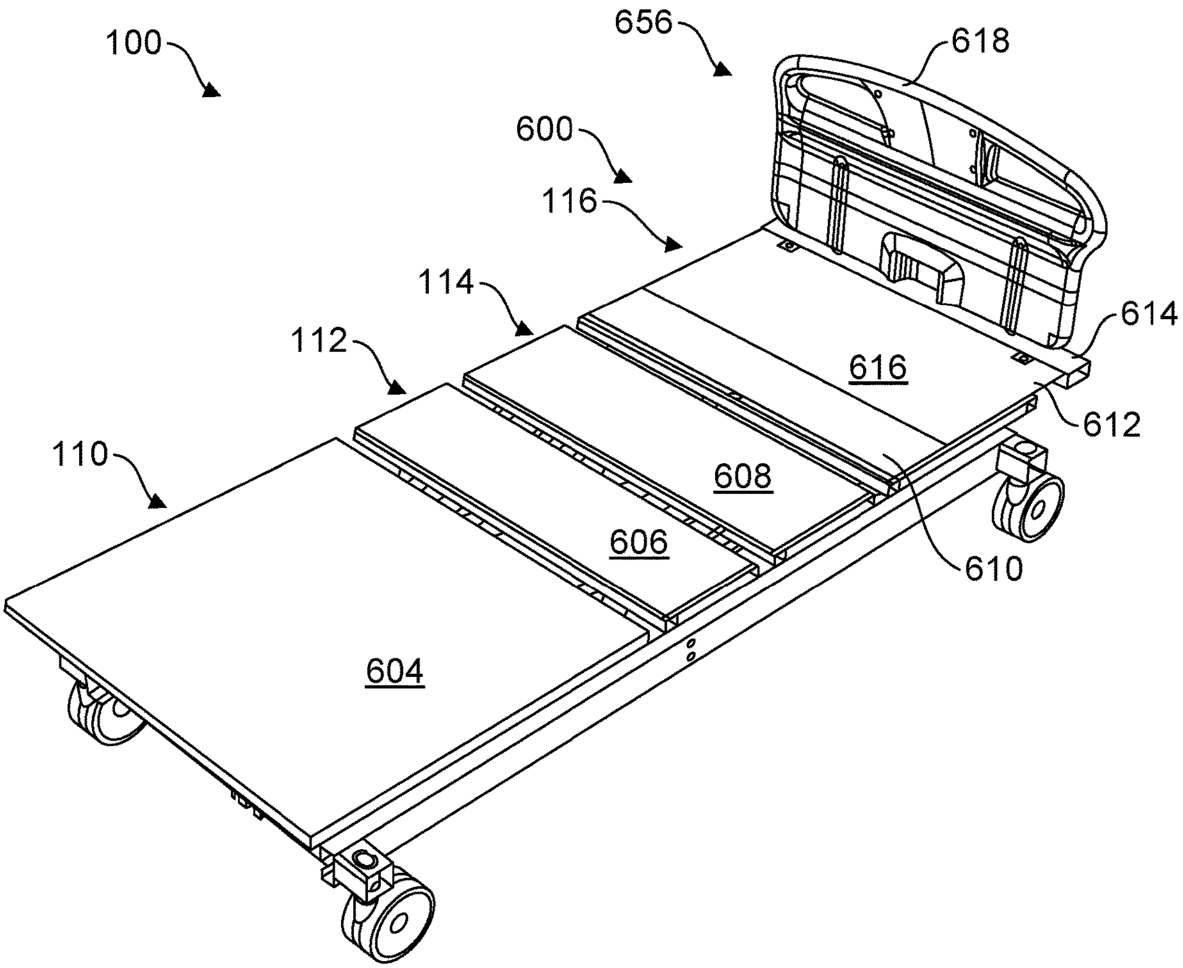
FIG. 11 is an isometric view of an embodiment of a patient support assembly with an extendable deck assembly in a retracted position.
Figure 12:
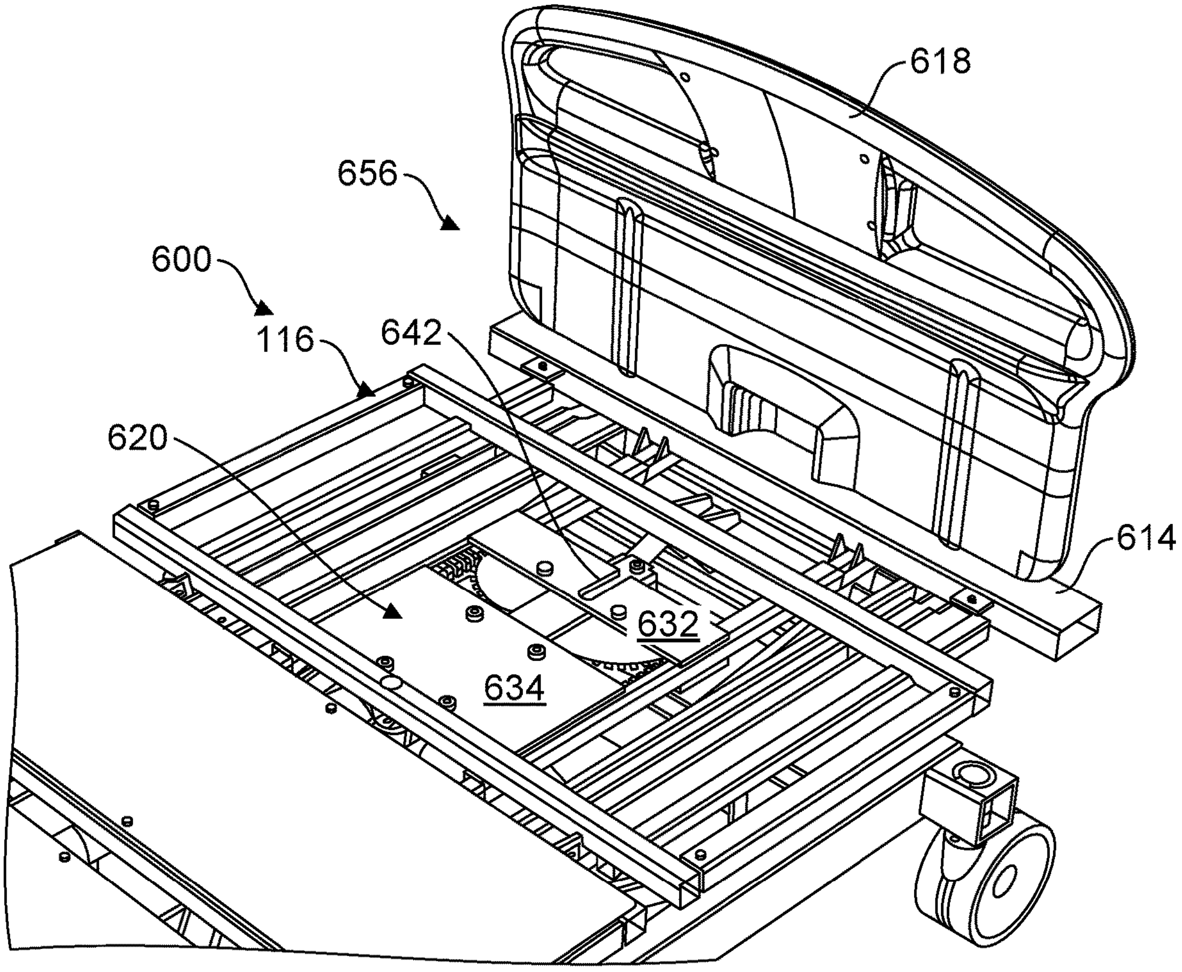
FIG. 12 is an isometric view of an embodiment of a patient support assembly with a multi-cam drive assembly.
Figure 13:
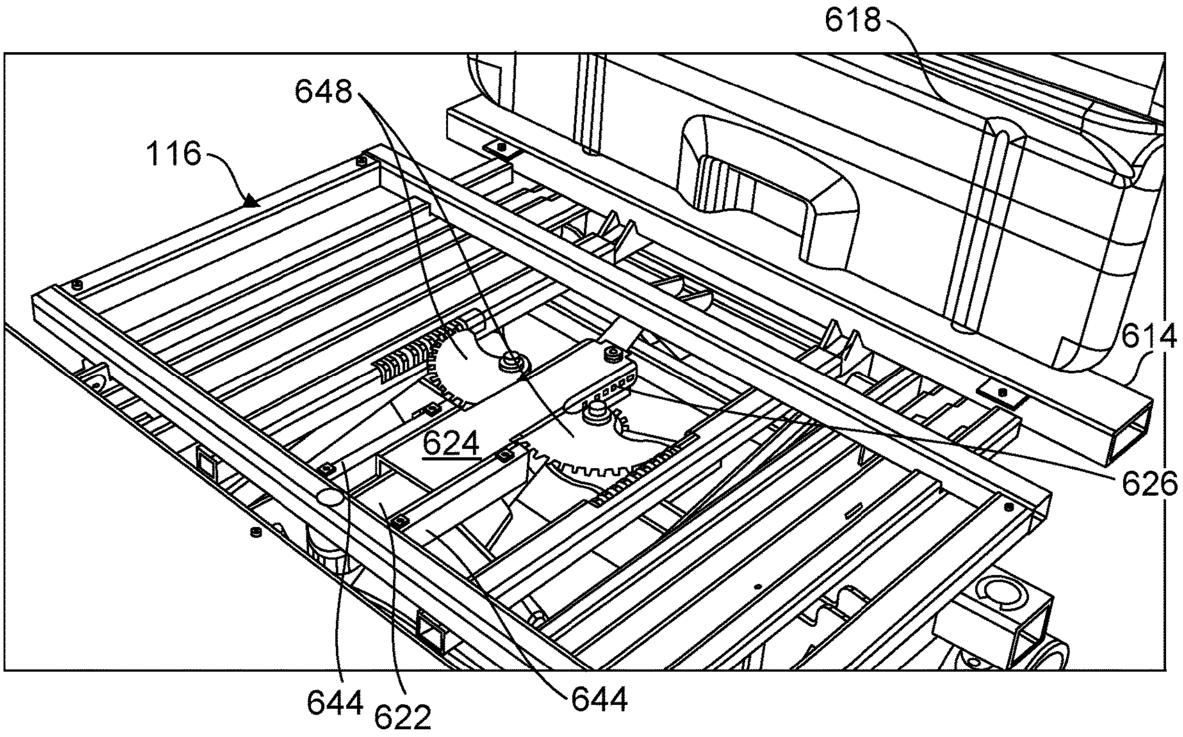
FIG. 13 is an isometric view of an embodiment of a patient support assembly with a multi-cam drive assembly.
Figure 14:
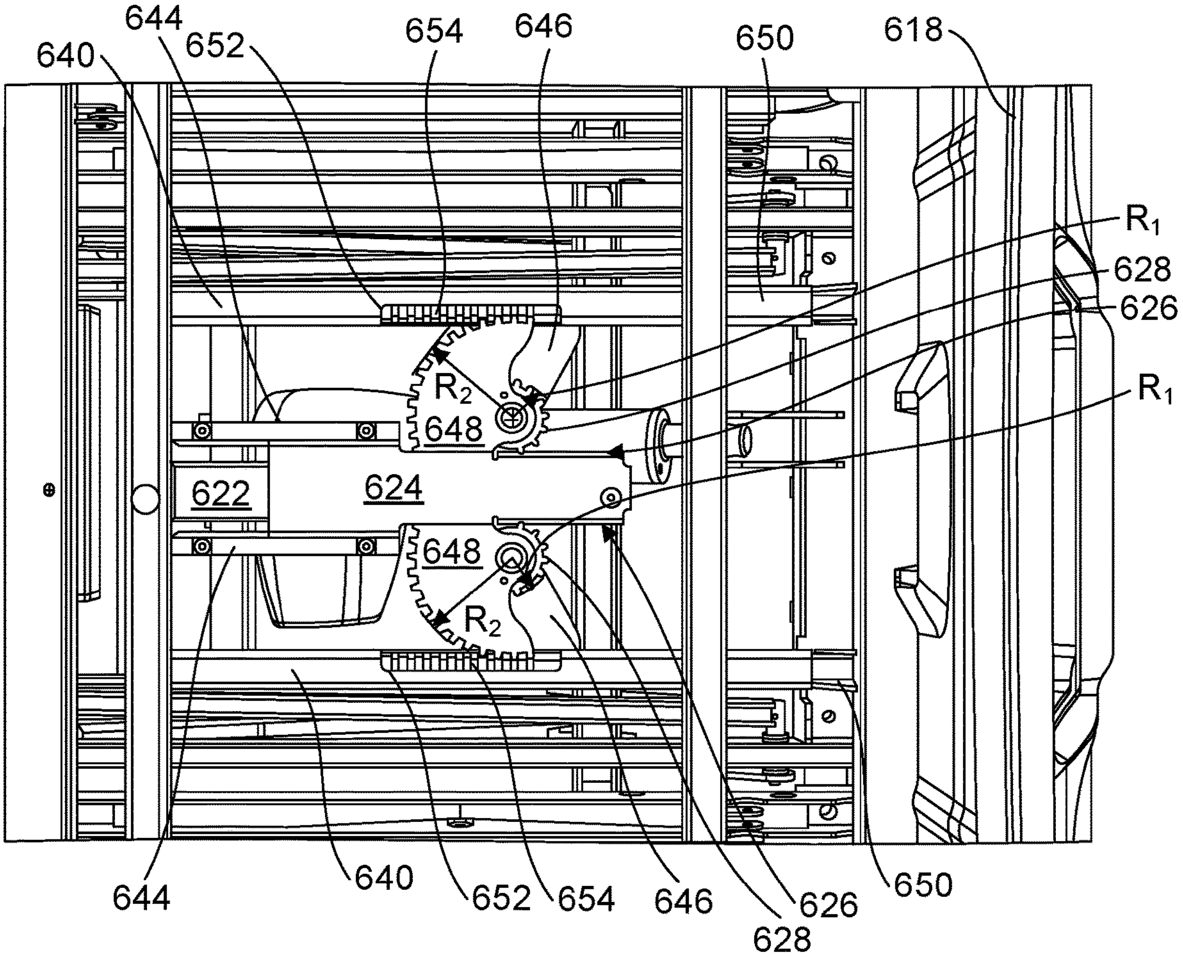
FIG. 14 is a top view of an embodiment of a patient support assembly with a multi-cam drive assembly.

Referring to FIG. 11, in an embodiment, an extendable assembly 600 is configured to adjust the length of the medical bed frame 100. The medical bed frame 100 may comprise a head deck 604 connected to the head section 110, an upper core deck 606 connected to the upper core section 112, a lower core deck 608 connected to the lower core section 114, a fixed foot deck 610 connected to the foot section 116, and an extendable foot deck 612 connected to an extendable frame 614. The extendable foot deck 612 is configured to slidably overlap the fixed foot deck 610 to provide a continuous support surface 616 between the fixed foot deck 610 and extendable foot deck 612. In an embodiment, a foot rail 618 is connected to the extendable frame 614.

Figure 15:
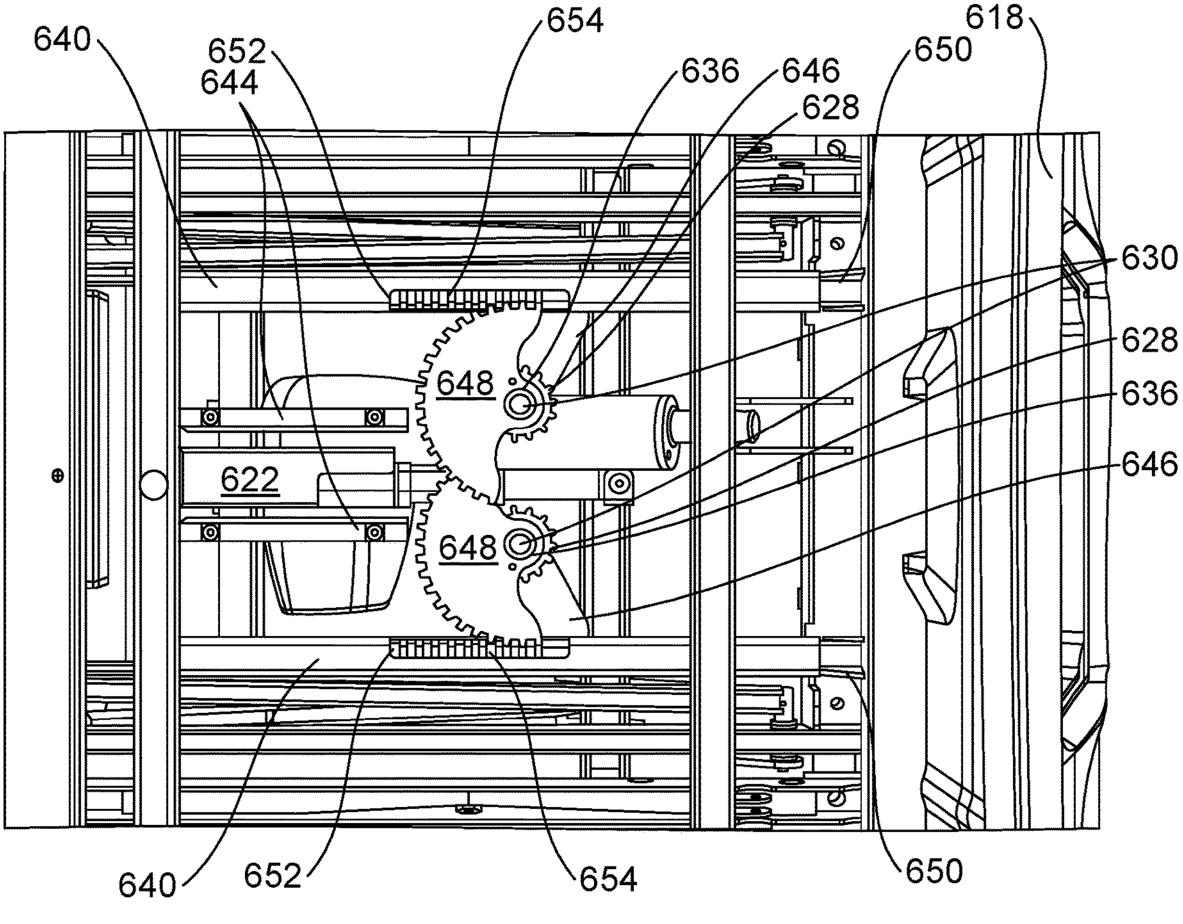
FIG. 15 is a top view of an embodiment of a patient support assembly with a multi-cam drive assembly.

Referring to FIGS. 12-15, in an embodiment, the extendable assembly 600 may include a multi-cam drive assembly 620 connected to the foot section 116 configured to extend or retract the extendable frame 614 in relation to the foot section 116. The multi-cam drive assembly 620 may include a linear drive mechanism 622, such as a linear actuator, connected between the foot section 116 and a drive member 624. The drive member 624 comprises a set of opposing slots 626 configured to engage a bottom pair of cams 628; whereby movement of the linear drive mechanism 622 moves the drive member 624 which rotates the bottom pair of cams 628 about a pair of shafts 630. The pair of shafts 630 each comprise a first distal end 636 and a second distal end 638 (not shown). The multi-cam drive assembly 620 may comprise a top pair of cams 648 connected to the pair of shafts 630 proximate the first distal end 636. The cams of the top pair of cams 648 may overlap with each other (as shown in FIG. 15). Each of the bottom pair of cams 628 having a first radius $R_1$, and each of the top pair of cams 648 having a second radius $R_2$; wherein $R_1$ may be less than $R_2$. In an embodiment, $R_1$ is 1 inch and $R_2$ is 3 inches. It is appreciated that the distance which the extendable frame 614 may travel depends on the stroke length of the linear drive mechanism 622 and the ratio of $R_1$ to $R_2$.

The axis of rotation of each of the pair of shafts 630 is oriented generally perpendicular to the direction of movement of the linear drive mechanism 622. A first top plate 632 is connected between the first distal ends 636; wherein the first top plate 632 abuts a pair of hollow support members 640 in order to restrain downward movement of the pair of shafts 630. The first top plate 632 may comprise a slot 642 to accommodate movement of the drive member 624. The second distal ends 638 (not shown) are connected to the pair of hollow support members 640 via a pair of bottom plates 646 in order to restrain upward movement of the pair of shafts 630. The drive member 624 slidably abuts a pair of support brackets 644 which restrain lateral movement of the drive member 624. In addition, the drive member 624 may be vertically disposed between the linear drive mechanism 622 and a second top plate 634; wherein the second top plate is connected between the pair of support brackets 644 and may extend laterally from the pair of support brackets 644 to the pair of hollow support members 640.

Figure 16:
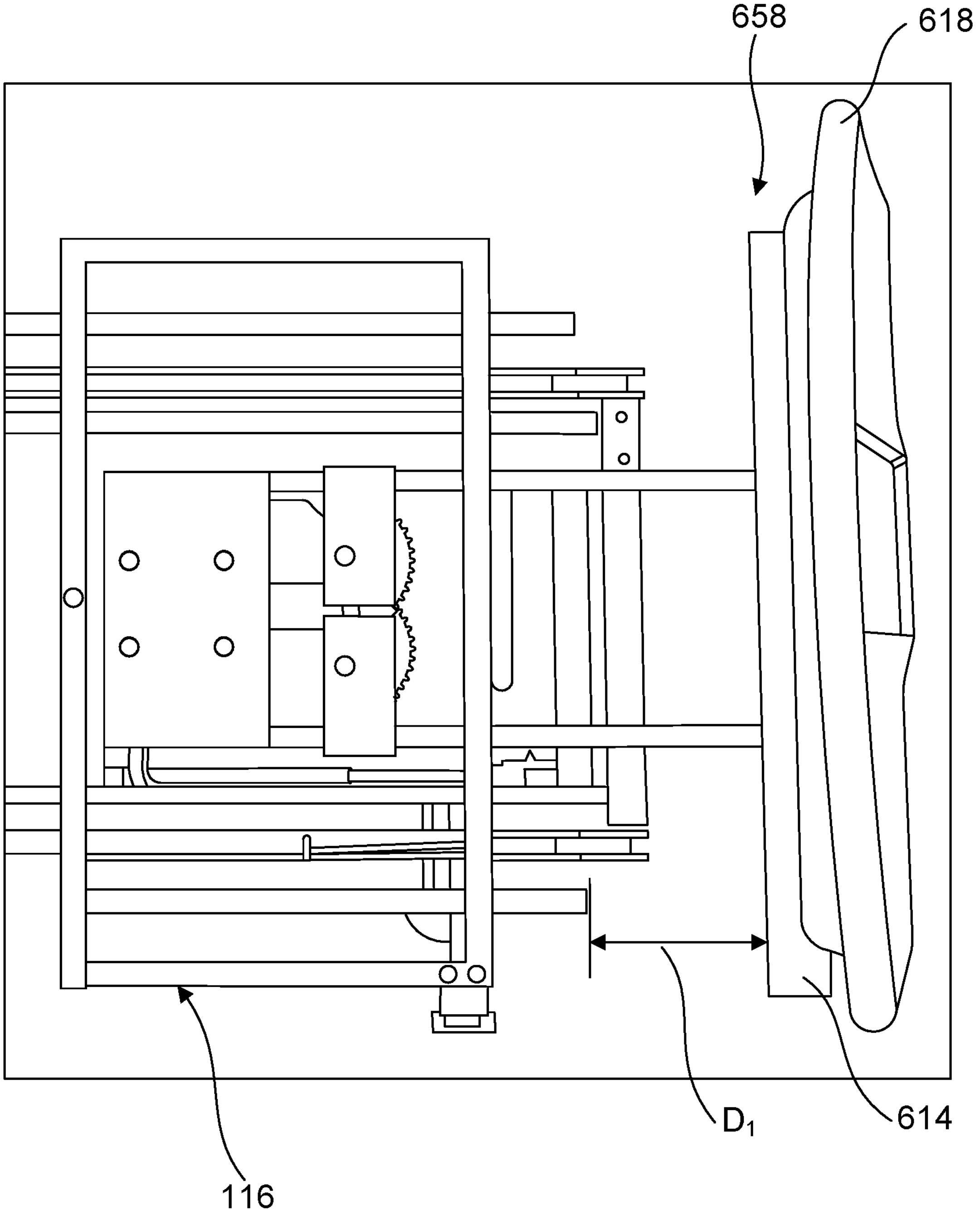
FIG. 16 is a top view of an embodiment of a patient support assembly with an extendable deck assembly in an extended position.

The extendable assembly 600 may further comprise a pair of extension members 650 connected to the extendable frame 614. The pair of extension members 650 are configured to slide within the pair of hollow support members 640 and include a pair of apertures 652 proximate the top pair of cams 648. The pair of extension members 650 include a plurality of slots 654 configured to engage the top pair of cams 648 through the pair of apertures 652. Rotation of the top pair of cams 648 urges the pair of extension members to slide within the pair of hollow support members and move the extendable frame 614 from a contracted position 656 to an extended position 658 (FIG. 16), along with any intermediate position (not shown) in between the contracted position 656 and the extended position 658. In an embodiment, the extendable frame travels a distance $D_1$ between about 8 inches to 10 inches.

Figure 17:
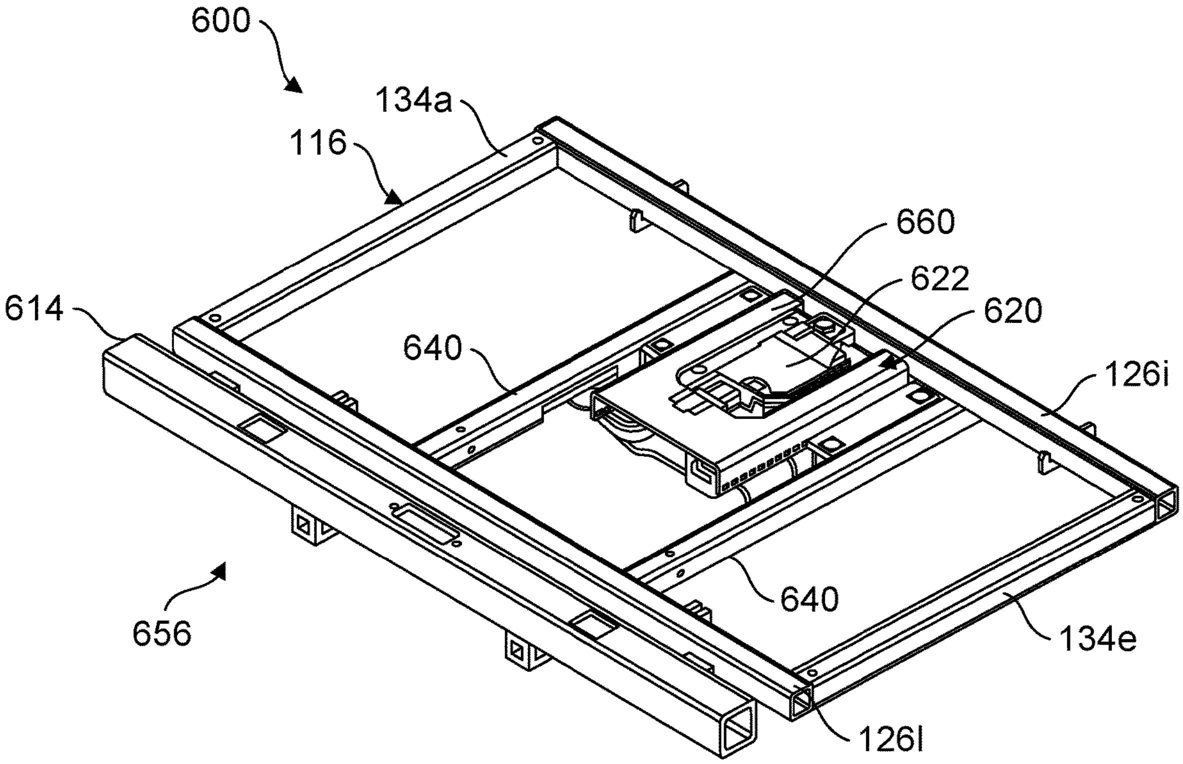
FIG. 17 is an isometric view of an embodiment of the extendable assembly in a contracted position.

Referring to FIG. 17, the extendable assembly 600 may comprise another embodiment of the multi-cam drive assembly 620 configured to adjust the extendable frame 614 away from or towards the foot section 116. The foot section 116 may be formed by a pair of lateral members (**126*i*,126*l*) perpendicularly connected to a pair side element (134*a*, 134*e*). The multi-cam drive assembly 620 may comprise a linear drive mechanism 622, such as a linear actuator, connected between the lateral member 126*i* and a slide plate assembly 660. The slide plate assembly 660 is slideably connected between the pair of hollow support members 640 via a set of brackets 662 connected to the pair of hollow support members 640. The slide plate assembly 660 may slide between the set of brackets 662 through actuation of the linear drive mechanism 622**.

Figure 18:
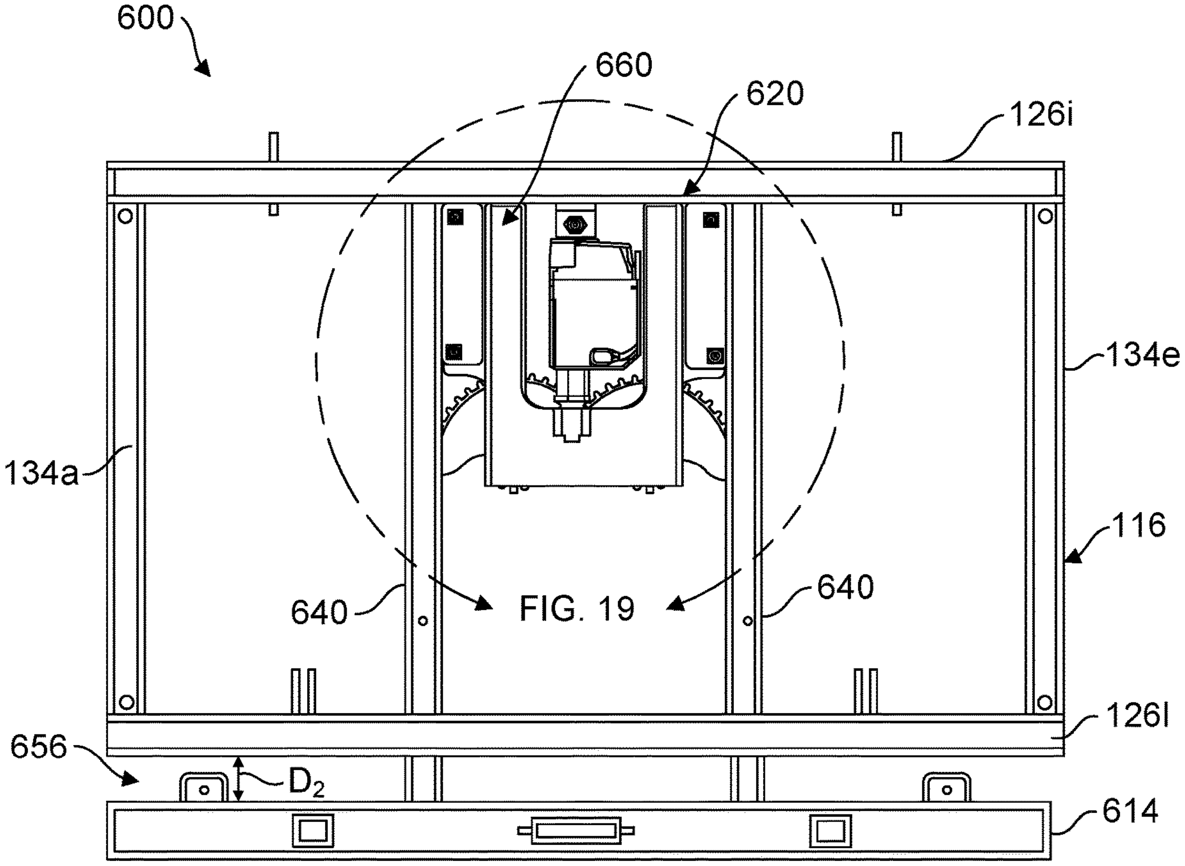
FIG. 18 is a top view of an embodiment of the extendable assembly in a contracted position.
Figure 19:
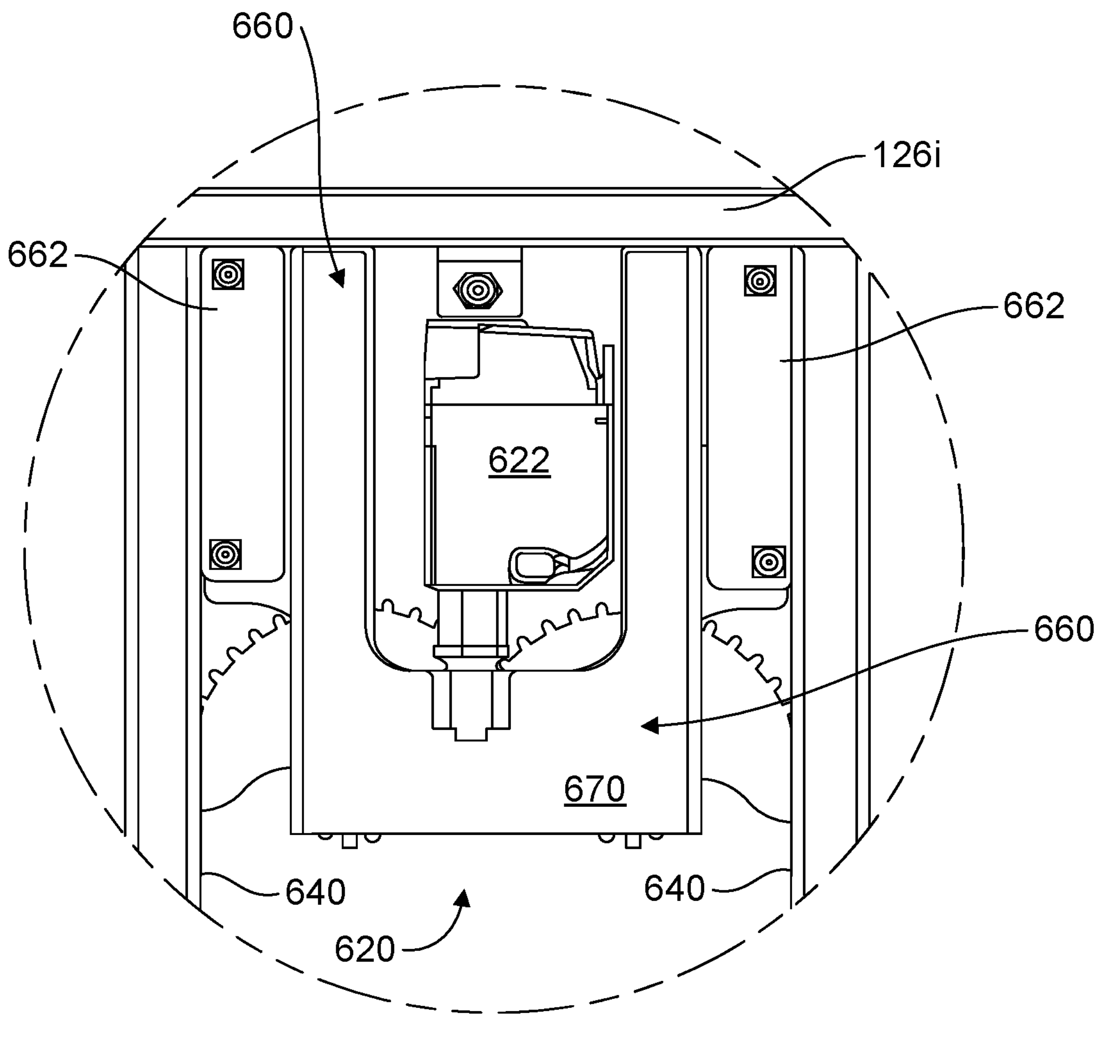
FIG. 19 is a top detailed view of an embodiment of the multi-cam drive assembly in the contracted position.
Figure 20:
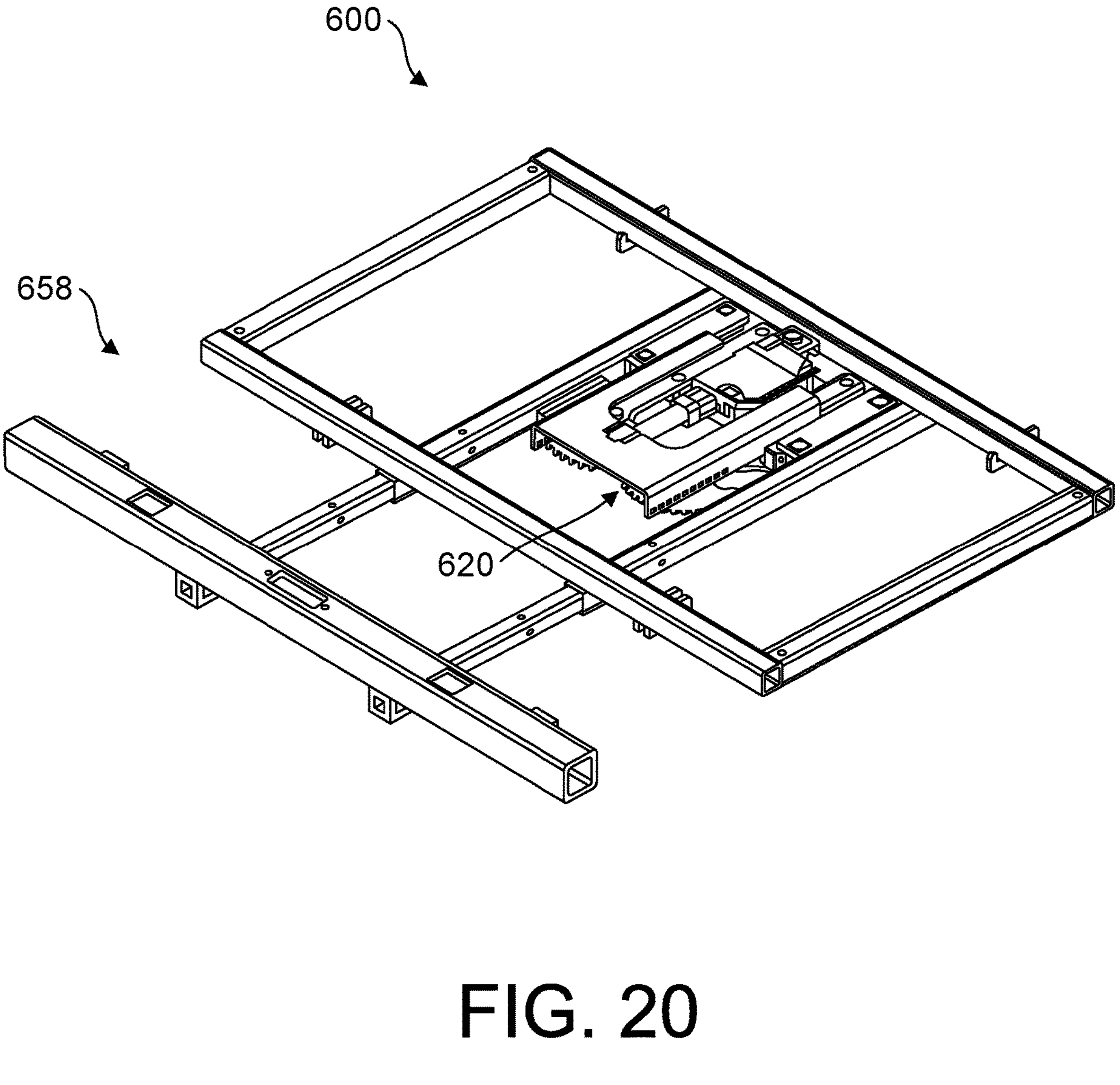
FIG. 20 is an isometric view of an embodiment of the extendable assembly in an extended position.
Figure 21:
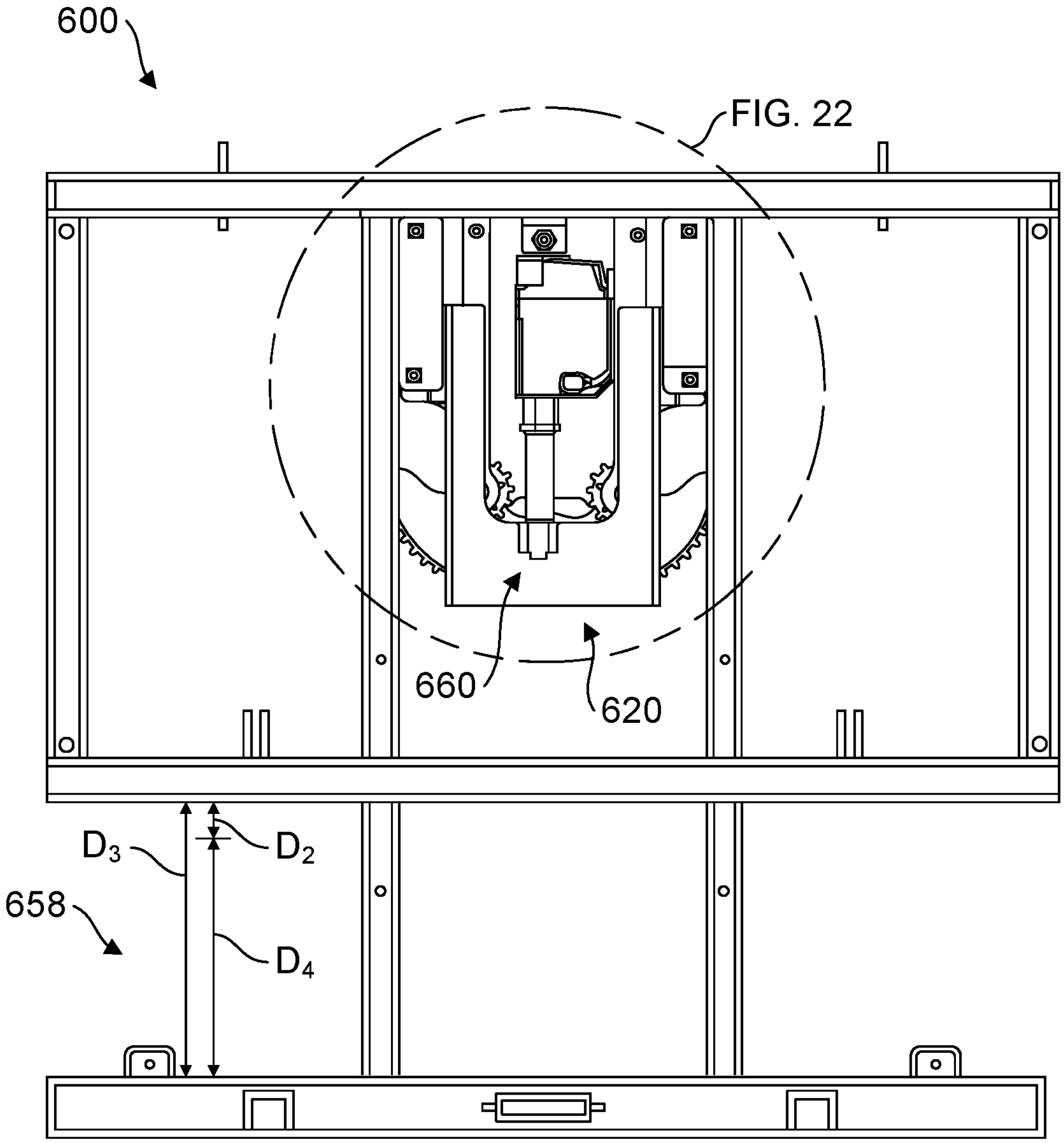
FIG. 21 is a top view of an embodiment of the extendable assembly in an extended position.

FIGS. 17-19 show the extendable frame 614 in a contracted position 656; FIGS. 20-21 show the extendable frame 614 in an extended position 658. In the contracted position 656 (FIG. 18), the extendable frame 614 is shown separated a second distance $D_2$ from the lateral member **126*l* of the foot section 116. In the extended position (FIG. 21), the extendable frame 614 is shown separated a third distance $D_3$ from the lateral member 126*l* of the foot section 116. The extendable assembly 600 may be extended or contracted between the contracted position 656 and extended position 658 a fourth distance $D_4$ between about 8 to 10 inches (FIG. 21**).

Figure 22:
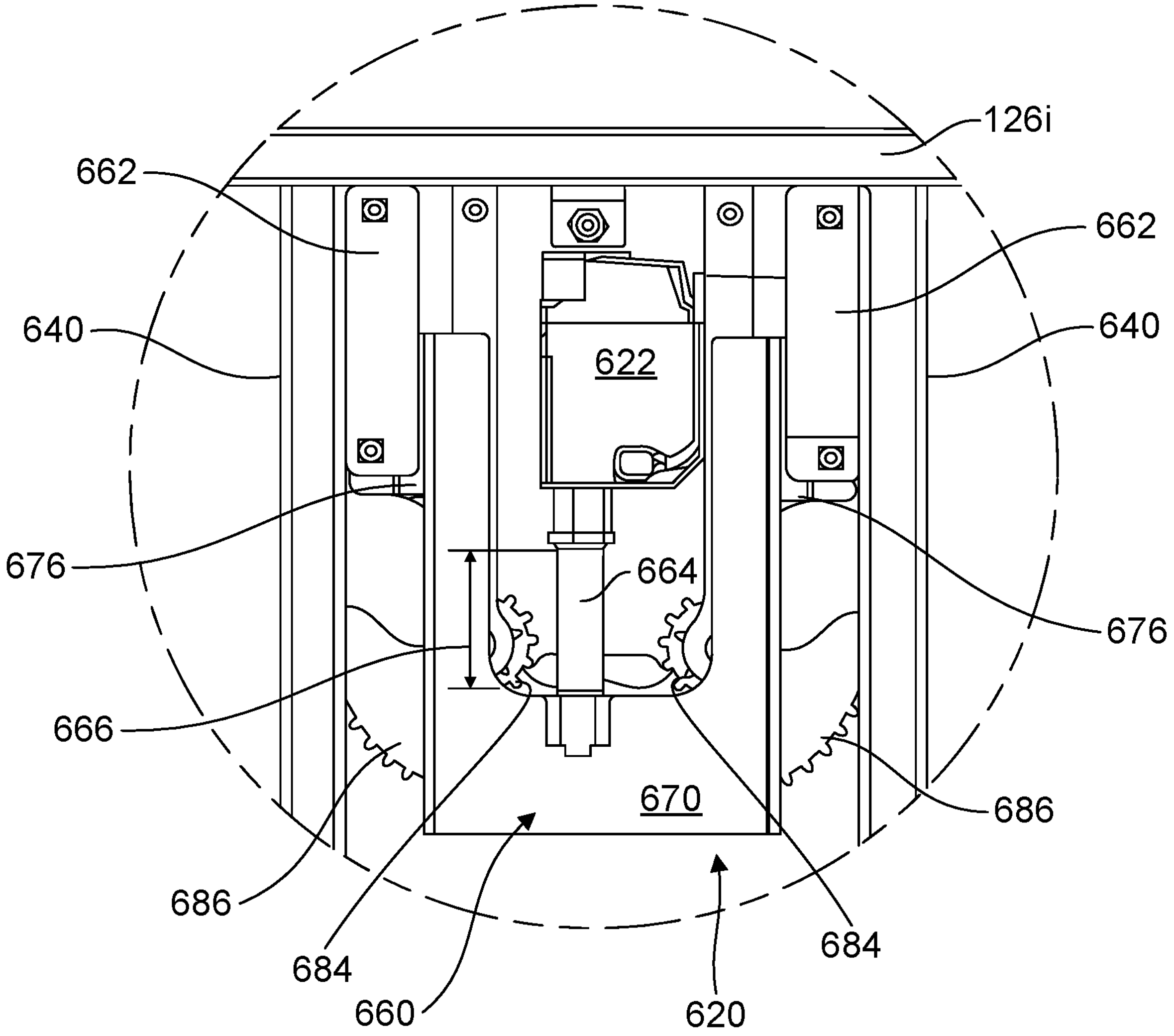
FIG. 22 is a is a top detailed view of an embodiment of the multi-cam drive assembly in the extended position.
Figure 23:
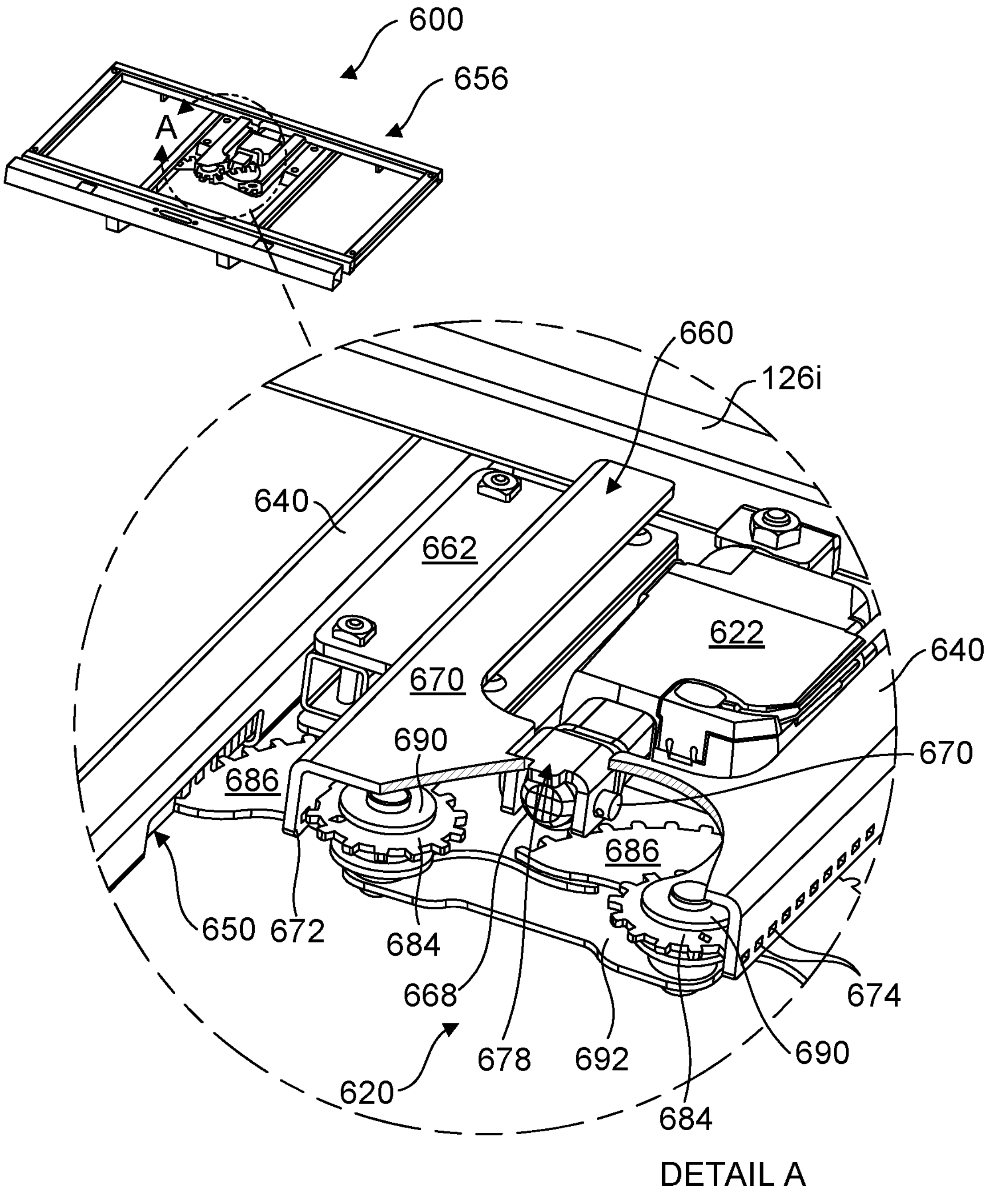
FIG. 23 is an isometric view of an embodiment of the multi-cam drive assembly in the contracted position.

Referring to FIGS. 22-23, the pair of gear assemblies 680 are connected between a pair of arms 690 and a connector plate 692; wherein the pair of arms 690 and the connector plate 692 are each rigidly connected to the set of brackets 662. In an embodiment, the toothed cams 685 may overlap each other while in a contracted position 656.

The linear drive mechanism 622 may comprise a drive shaft 664 having a stroke length 666 between about 2 to 4 inches. In an embodiment the stroke length 666 is about 3 inches. The drive shaft 664 comprises a third distal end 668 connected to the slide plate assembly 660; whereby movement the drive shaft 664 moves the slide plate assembly 660. In an embodiment, the third distal end 668 is connected to the slide plate assembly by means of a clev is pin 671 connected to a central strut 678. Other means of mechanical attachment may be used to connect the third distal end to the slide plate assembly, such as welds, screws, clamps, threads, gaskets, etc.

Figure 24:
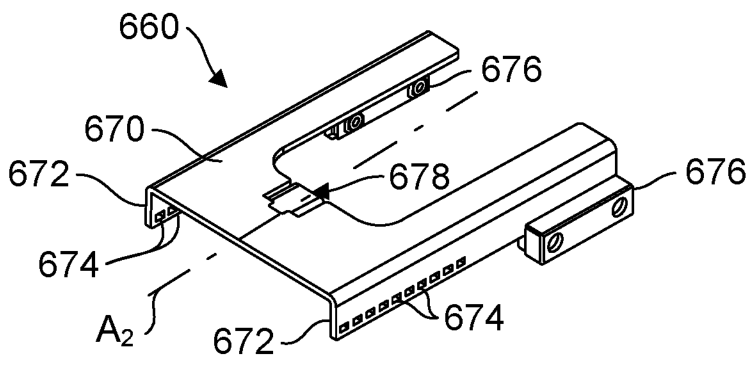
FIG. 24 is an isometric view of an embodiment of a slide plate assembly.

Referring to FIG. 24, in an embodiment, slide plate assembly 660 includes a top plate 670 having a central axis $A_2$. The top plate 670 includes a pair of side walls 672 in parallel arrangement with the central axis $A_2$. The pair of side walls 672 extend downwardly from opposite sides of the top plate 670. Each of the pair of side walls 672 includes a plurality of apertures 674 linearly disposed through each of the pair of side walls 672. The slide plate assembly 660 includes a pair of projections 676 extending laterally from the pair of side walls 672. In an embodiment, the slide plate assembly 660 includes a central strut 678 disposed along a second central axis $A_2$ of the slide plate assembly 660, the central strut 678 configured to connect with the third distal end 668 of the drive shaft 664.

Figure 25:
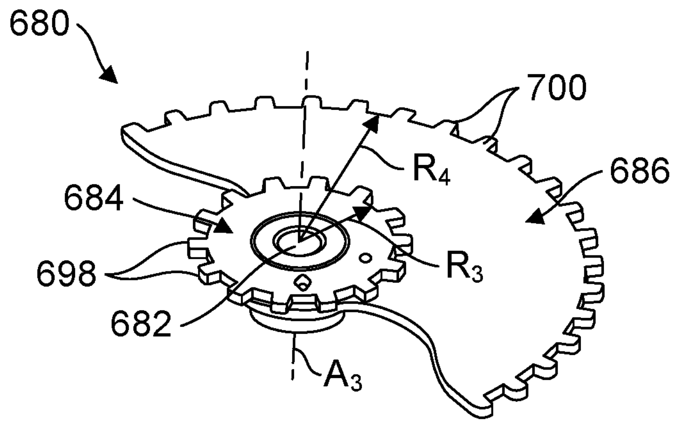
FIG. 25 is an isometric view of the gear assembly.

Referring to FIGS. 23 and 25, in an embodiment, the multi-cam drive assembly 620 may include a pair of gear assemblies 680. Each of the pair of gear assemblies 680 includes a hub 682, a toothed wheel 684 affixed to the hub 682, and a toothed cam 686 affixed to the hub 682. The hub 682, toothed wheel 684, and toothed cam 686 may rotate together about a third central axis $A_3$; whereby rotation of the toothed wheel 684 rotates the toothed cam 686 about the third central axis $A_3$. Each of the toothed wheels 684 having a third radius $R_3$, and each of the toothed cams 686 having a fourth radius $R_4$; wherein $R_3$ may be less than $R_4$. It is appreciated that the distance which the extendable frame 614 may travel depends on the stroke length 666 of the linear drive mechanism 622 and the ratio of $R_3$ to $R_4$. In some embodiments, $R_3$ is about 1 inch and $R_4$ is about 3 inches. In other embodiments, the ratio of $R_3$:$R_4$ is about 1:3. It is appreciated that $R_3$ and $R_4$ may have other dimensions depending on the application.

A first set of teeth 698 are disposed along the periphery of the toothed wheels 684, wherein the first set of teeth 698 are configured to engage the slide plate assembly 660 by meshing with the plurality of apertures 674. A second set of teeth 700 are disposed along the periphery of the toothed cam 686, wherein the second set of teeth 700 are configured to engage the plurality of slots 654. Movement of the slide plate assembly 660 may rotate each of the pair of gear assemblies 680 in opposite directions and may move the pair of extension members 650 in one of a first direction or a second direction opposite the first direction.

Figure 26:
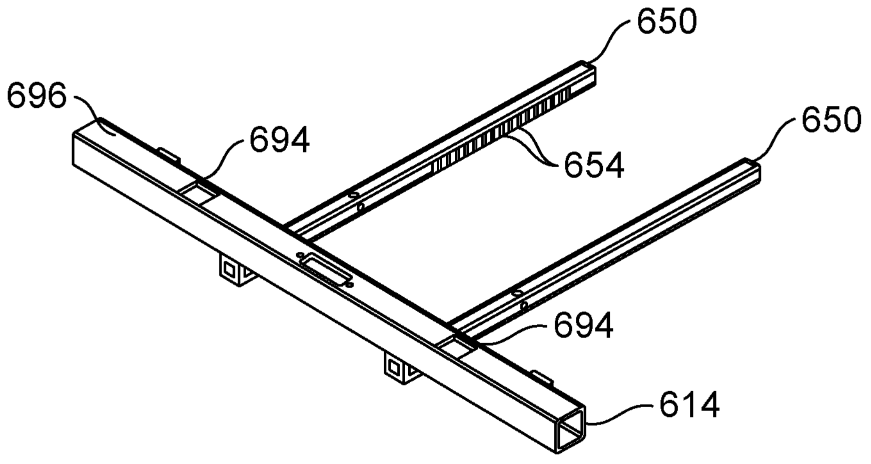
FIG. 26 is an isometric view of an extendable frame and pair of extension members.

Referring to FIG. 26, the extendable frame 614 is connected to the pair of extension members 650 having a plurality of slots 654 disposed along the inner sides of the pair of extension members 650. The pair of extension members 650 are configured to slide within the pair of hollow support members (not shown). The plurality of slots is configured to engage the toothed cams 686 (not shown) and urge the movement of the pair of extension members 650 by rotation of the toothed cams 686. The extendable frame 614 may include holes 694 disposed through an upper surface 696 to attach the foot rail 618 (not shown) to the extendable frame 614.

Figure 27:
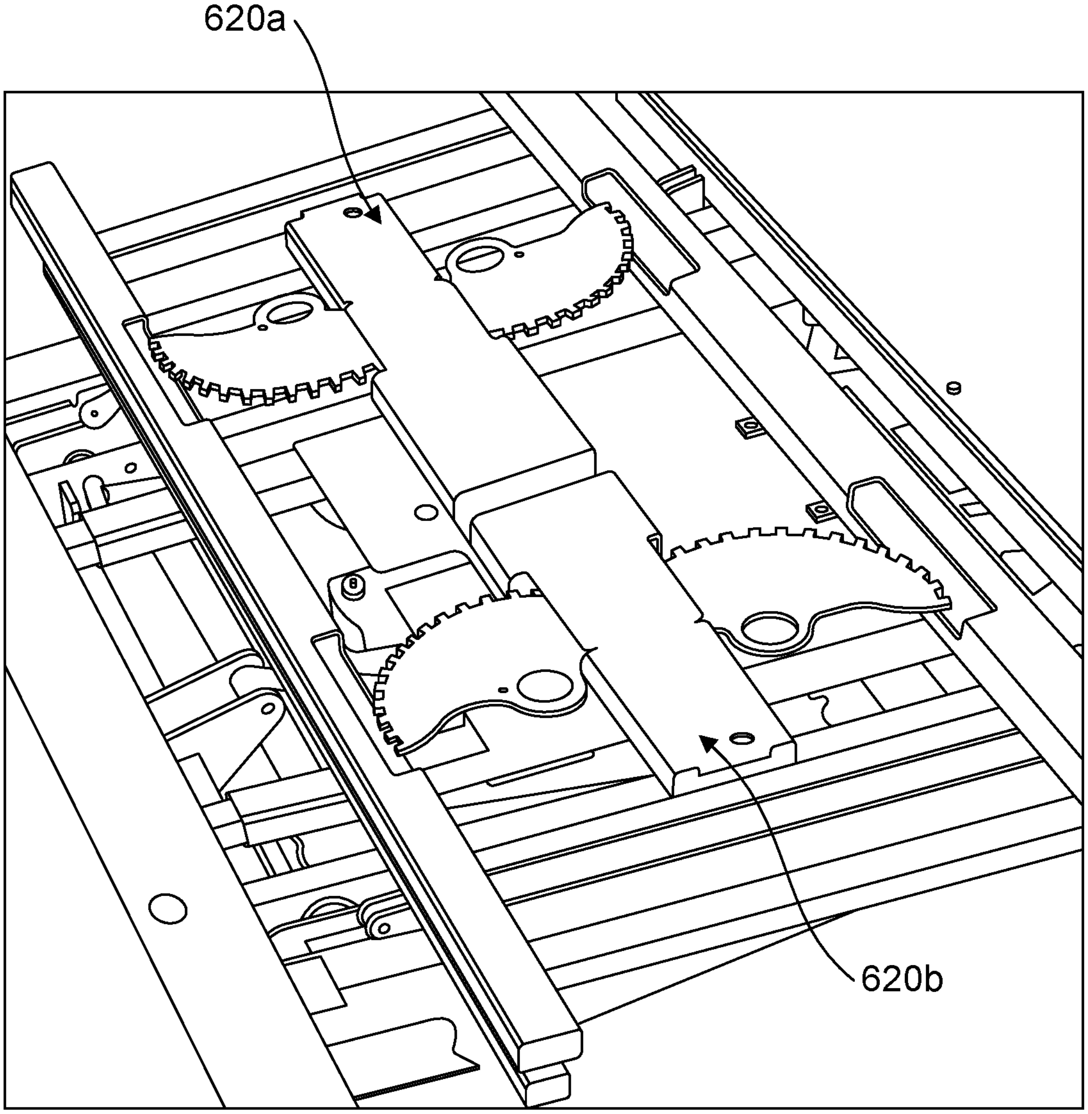
FIG. 27 is a perspective view of an embodiment of a patient support assembly with a pair of multi-cam drive assemblies.

Referring to FIG. 27, in an embodiment, a partial view of a pair of multi-cam drive assemblies 620*a,b* illustrates that the pair of side members 124*a,b* (not shown) may be adjusted by using the pair of multi-cam drive assemblies 620*a,b*. Each of the pair multi-cam drive assemblies 620*a,b* may be configured to independently adjust one of the side members 124*a,b*. In an embodiment, a pair of multi-cam drive assemblies 620*a,b* may replace the first drive assembly 200 to adjust the width W between the pair of side members 124*a,b*. In another embodiment, a pair of multi-cam drive assemblies 620*a,b* may replace the second drive assembly 300 to adjust the width W between the pair of side members 124*a,b*.

Methods of Use

In an embodiment, a method of adjusting a width of a medical bed frame may comprise the steps of: (1) providing a patient support assembly comprising: (a) a pair of side members having plurality of sliding members, wherein the plurality of sliding members are slideably engaged with a plurality of lateral members, and (b) a pair of cams in rotational engagement with the plurality of sliding members; (2) rotating a pair of cams in opposite directions, thereby moving the one or more of the plurality of sliding members and pair of side members in opposite directions and adjusting the width of the medical bed frame. The method may further comprise the step of providing an actuator operatively connected to the pair of cams to selectively move the pair of side members in one of a first direction and a second direction opposite the first direction. The method may further comprise the step of providing a cable operatively connected to the pair of cams and a cable manifold, whereby movement of the cable by the cable manifold selectively moves the pair of side members in one of a first direction and a second direction opposite the first direction. The method may further comprise providing a plurality of cables connected between the cable manifold and a plurality of pair of cams, whereby movement of the plurality of cables by the cable manifold selectively moves the pair of side members in one of a first direction and a second direction opposite the first direction. The method may further comprise providing a single cable connected between the cable manifold and a plurality of pair of cams, whereby movement of the single cable by the cable manifold selectively moves the pair of side members in one of a first direction and a second direction opposite the first direction.

In an embodiment, a first method of adjusting a length of a medical bed frame may comprise the steps of: (step 1) providing a medical bed frame having an extendable assembly, the extendable assembly comprising: a multi-cam drive assembly connected to a foot section, the multi-cam drive assembly comprising: a linear drive mechanism; a drive member connected to the linear drive mechanism, the drive member having a pair of opposing slots; a bottom pair of cams in rotational engagement with the pair of opposing slots; and a top pair of cams connected to the bottom pair of cams; a pair of hollow support members; a pair of extension members having a plurality of slots, the pair of extension members disposed within the pair of extension members, the top pair of cams in rotational engagement with plurality of slots; and an extendable frame connected to the pair of extension members, whereby adjustment of the linear drive mechanism rotates the pair of bottom cams and the pair of top cams resulting in linear movement of the pair of extension members within the pair of hollow support members; and (step 2) adjusting the linear drive mechanism towards the head of the bed frame; thereby moving the pair of extension members and the extendable frame away from the foot section.

In an embodiment, the first method of adjusting a length of a medical bed frame may further comprise the step of: (step 3) adjusting the linear drive mechanism towards the foot of the bed frame; thereby moving the pair of extension members and the extendable frame towards the foot section.

In an embodiment, the first method of adjusting a length of a medical bed frame may comprise one or more of the above steps in the following order: step 1, step 2, and step 3; step 1, step 3 and step 2; or step 1 and step 3. Similar methods for adjusting the width of the medical bed frame may utilize the multi-cam drive assembly connected to a side rail.

In another embodiment, a second method of adjusting a length of a medical bed frame may comprise the steps of: (step 1) providing a medical bed frame having an extendable assembly, the extendable assembly comprising: a multi-cam drive assembly connected to a foot section, the multi-cam drive assembly comprising: a linear drive mechanism; a slide plate assembly connected to the linear drive mechanism, the slide plate assembly having a plurality of apertures; and a pair of gear assemblies in rotational engagement with the plurality of apertures, wherein each of the pair of gear assemblies include a tooth wheel and a toothed cam; a pair of hollow support members; a pair of extension members having a plurality of slots, the pair of extension members disposed within the pair of extension members, the toothed wheels are in rotational engagement with plurality of slots; and an extendable frame connected to the pair of extension members, whereby adjustment of the linear drive mechanism rotates the toothed wheels and toothed cams resulting in linear movement of the pair of extension members within the pair of hollow support members; and (step 2) adjusting the linear drive mechanism towards the foot end of the bed frame; thereby moving the pair of extension members and the extendable frame away from the foot section.

In an embodiment, the second method of adjusting a length of a medical bed frame may further comprise the step of: (step 3) adjusting the linear drive mechanism towards the head end of the bed frame; thereby moving the pair of extension members and the extendable frame towards the foot section.

In an embodiment, the second method of adjusting a length of a medical bed frame may comprise one or more of the above steps in the following order: step 1, step 2, and step 3; step 1, step 3 and step 2; or step 1 and step 3. Similar methods for adjusting the width of the medical bed frame may utilize the multi-cam drive assembly connected to a side rail.

In an embodiment, a method of adjusting a width of a medical bed frame may comprise the steps of: (1) providing a patient support assembly comprising: a pair of side members having a plurality of sliding members, wherein the plurality of sliding members are slideably engaged with a plurality of lateral members; and a pair of multi-cam assemblies connected to the plurality of sliding members, each of the multi-cam assemblies comprising: a linear drive mechanism; a drive member connected to the linear drive mechanism, the drive member having a pair of opposing slots; a bottom pair of cams in rotational engagement with the pair of opposing slots; and a top pair of cams connected to the bottom pair of cams, the top pair of cams in rotational engagement with the plurality of sliding members, whereby adjustment of the linear drive mechanism rotates the pair of bottom cams and the pair of top cams resulting in linear movement of the plurality of sliding members; and (2) adjusting the linear drive mechanisms, thereby moving the pair of side members in opposite directions and adjusting the width of the medical bed frame.

It is to be understood that while certain aspects of the disclosed subject matter have been shown and described, the disclosed subject matter is not limited thereto and encompasses various other embodiments and aspects.

The invention claimed is:

1. A medical bed frame comprising:

an extendable frame slidably connected to a foot section of the medical bed frame; and a multi-cam drive assembly connected to the foot section, the multi-cam drive assembly comprising:

a linear drive mechanism connected to the foot section;

a drive member connected to the linear drive mechanism; wherein the drive member comprising a set of opposing slots configured to engage and rotate a bottom pair of cams;

a top pair of cams connected to the bottom pair of cams; whereby rotation of the bottom pair of cams rotates the top pair of cams; and a pair of extension members connected to the foot section, the pair of extension members having a plurality of slots configured to engage the top pair of cams, whereby rotation of the top pair of cams urges the pair of extension members to move the foot section.

2. The medical bed frame of claim 1, wherein each cam of the bottom pair of cams having a first radius, wherein each cam of the top pair of cams having a second radius, the first radius is less than the second radius.

3. The medical bed frame of claim 1, wherein the linear drive mechanism comprises a linear actuator.

4. A medical bed frame comprising:

an extendable frame slidably connected to a foot section of the medical bed frame; and a multi-cam drive assembly connected between the foot section and the extendable frame, the multi-cam drive assembly comprising:

a slide plate assembly slidably connected to the foot section, the slide plate assembly having a pair of gear assemblies engaging a pair of extension members; and a linear drive mechanism connected between the foot section and the slide plate assembly, whereby actuation of the linear drive mechanism urges rotation of the pair of gear assemblies resulting in movement of the pair of extension members.

5. The medical bed frame of claim 4, wherein each of the pair of gear assemblies comprise a toothed wheel connected to a toothed cam along a third central axis.

6. The medical bed frame of claim 5, wherein the slide plate assembly comprises a pair of side walls having a plurality of apertures linearly disposed through each of the pair of side walls.

7. The medical bed frame of claim 5, wherein the toothed wheel comprises a third radius, wherein the toothed cam comprising a fourth radius, the third radius is less than the fourth radius.

8. The medical bed frame of claim 5, wherein the pair of extensions members comprise a plurality a slots configured to engage the toothed cam.

9. The medical bed frame of claim 8, wherein the pair of extension members are configured to slide within a pair of hollow support members.

* * * * *